United States Patent
Abe et al.

(10) Patent No.: US 11,995,260 B2
(45) Date of Patent: May 28, 2024

(54) DISPLAY DEVICE

(71) Applicant: Japan Display Inc., Tokyo (JP)

(72) Inventors: Daichi Abe, Tokyo (JP); Akihiko Fujisawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/119,561

(22) Filed: Mar. 9, 2023

(65) Prior Publication Data

US 2023/0289002 A1   Sep. 14, 2023

(30) Foreign Application Priority Data

Mar. 10, 2022   (JP) .................. 2022-037168

(51) Int. Cl.
*G06F 3/041*   (2006.01)
*G02F 1/1362*   (2006.01)

(52) U.S. Cl.
CPC ...... *G06F 3/0412* (2013.01); *G02F 1/136218* (2021.01); *G06F 2203/04101* (2013.01)

(58) Field of Classification Search
CPC ......... G06F 3/0412; G06F 2203/04101; G06F 2203/04107; G06F 3/041; G06F 3/0443; G06F 3/0445; G06F 3/0446; G02F 1/136218
See application file for complete search history.

(56) References Cited

U.S. PATENT DOCUMENTS

| | | | | |
|---|---|---|---|---|
| 11,567,615 B2* | 1/2023 | Fujisawa | ............... | G06F 3/0412 |
| 2015/0293643 A1* | 10/2015 | Shepelev | .............. | G06F 3/0412 |
| | | | | 345/174 |
| 2017/0262112 A1* | 9/2017 | Noguchi | ............ | G02F 1/13338 |
| 2018/0348822 A1* | 12/2018 | Hiraide | ................. | G06F 3/0393 |
| 2019/0095008 A1* | 3/2019 | Murata | ................ | G06F 3/0444 |
| 2019/0215794 A1* | 7/2019 | Sayem | ..................... | H01Q 1/50 |
| 2019/0286281 A1* | 9/2019 | Aoki | ...................... | G06F 3/044 |

FOREIGN PATENT DOCUMENTS

JP        2018-205150 A        12/2018

* cited by examiner

*Primary Examiner* — Grant Sitta
(74) *Attorney, Agent, or Firm* — K&L Gates LLP

(57) ABSTRACT

According to one embodiment, a display device includes a display area for displaying an image, a plurality of detection electrodes and a movable electrode. The plurality of detection electrodes are disposed in a peripheral area surrounding the display area. The movable electrode is disposed in such a way as to surround the detection electrodes and is movable around the detection electrodes. The movable electrode has a length corresponding to a length of each of the detection electrodes in a peripheral direction.

14 Claims, 20 Drawing Sheets

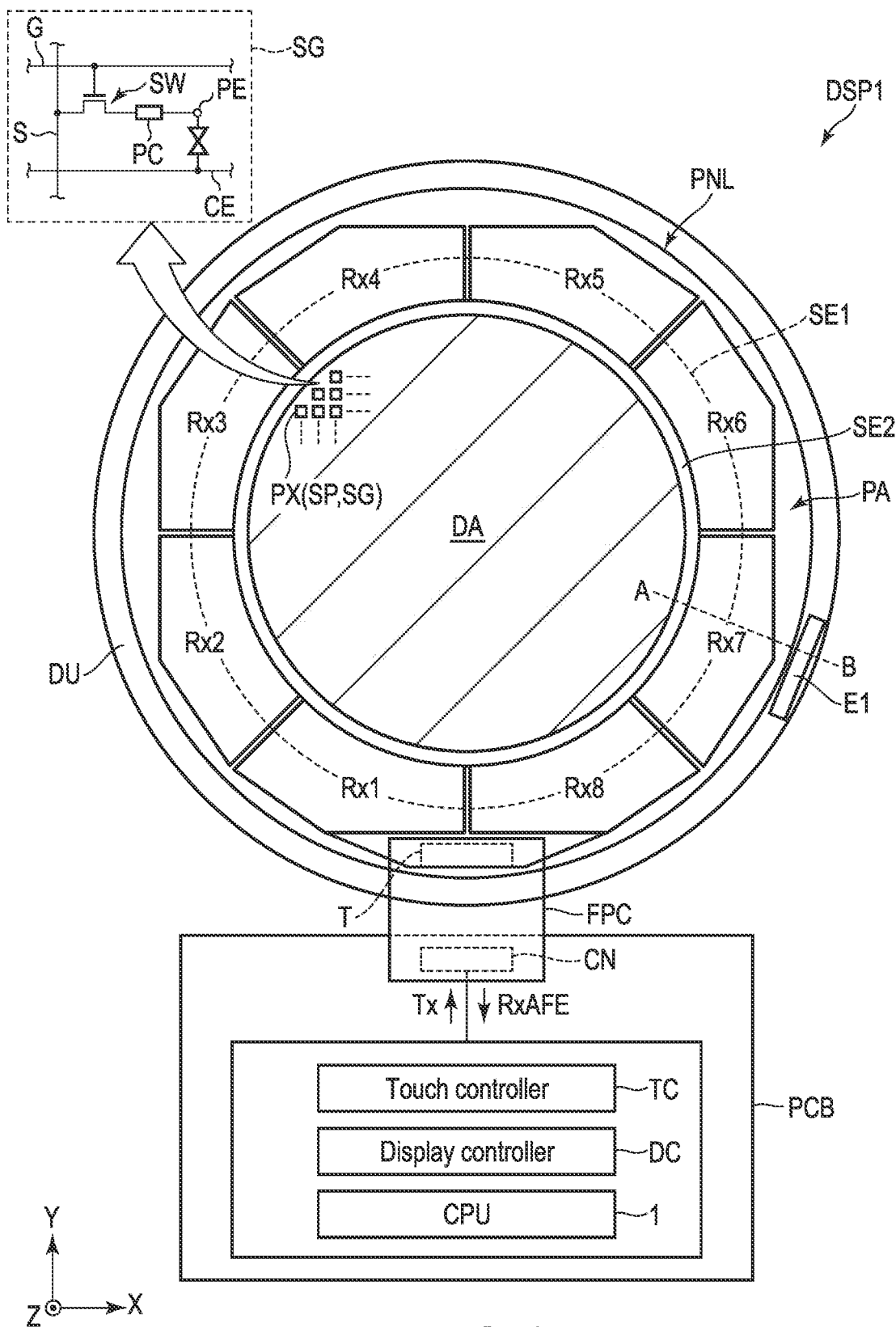
F I G. 1

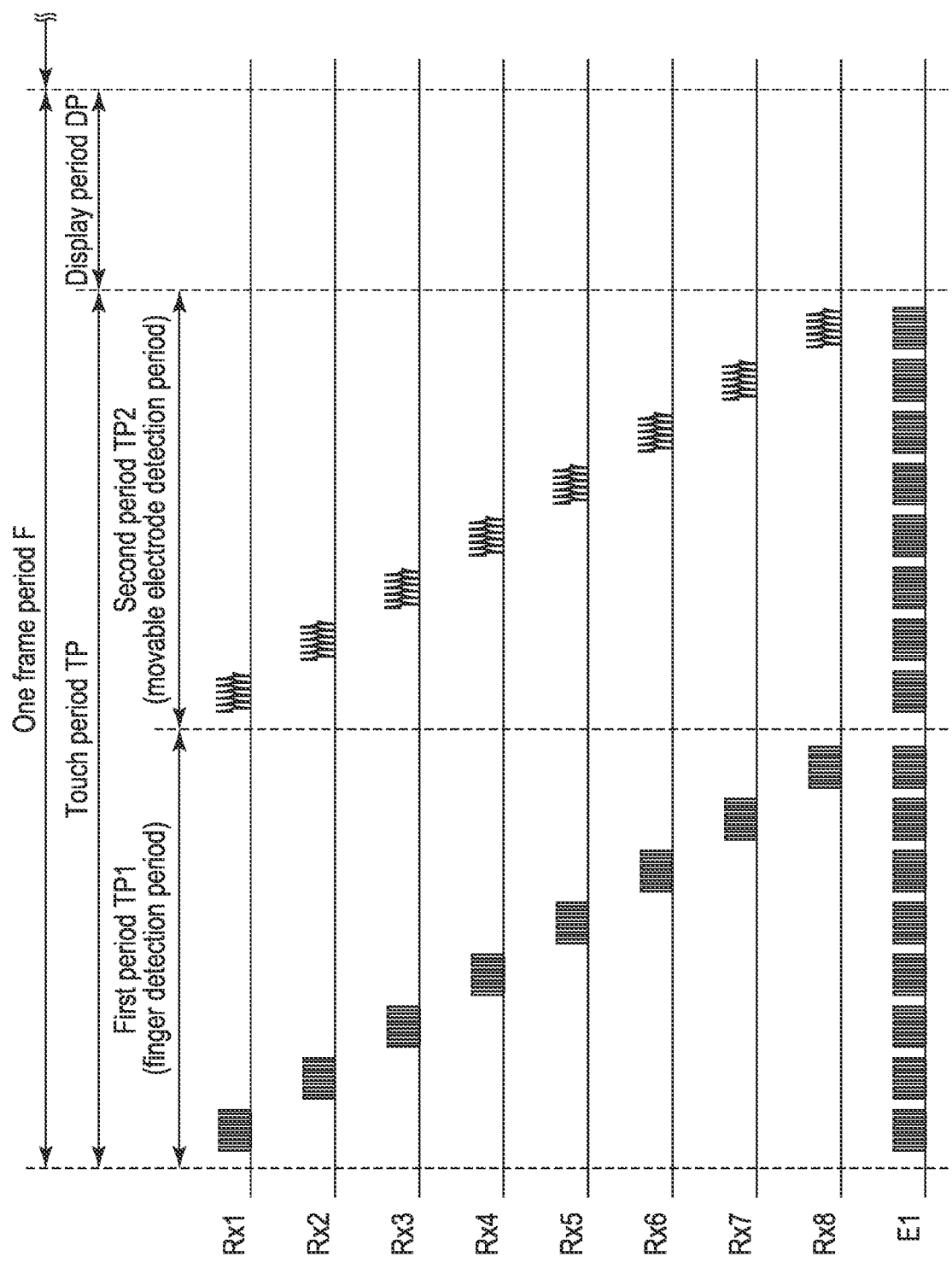
F I G. 2

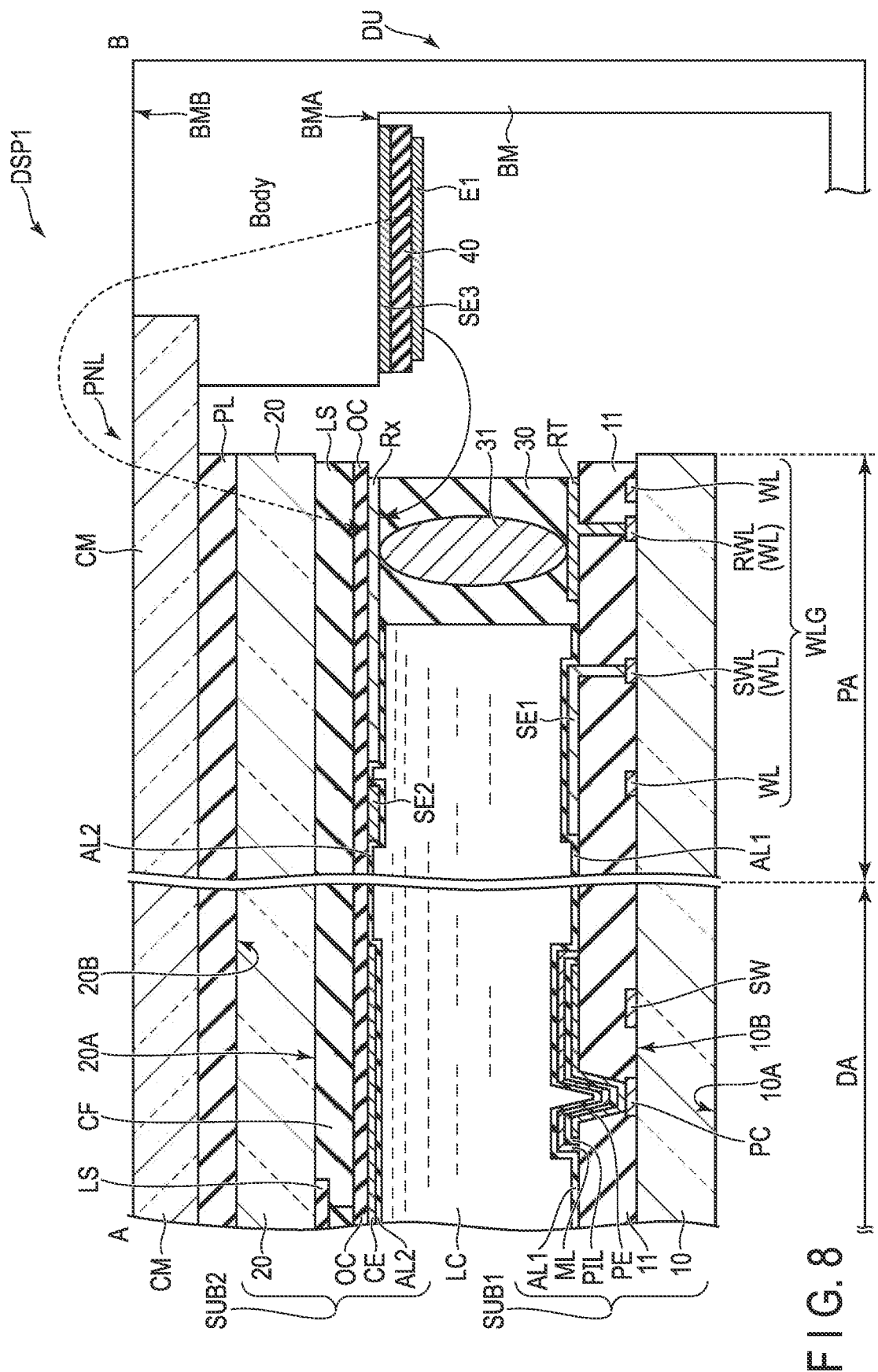
F I G. 8

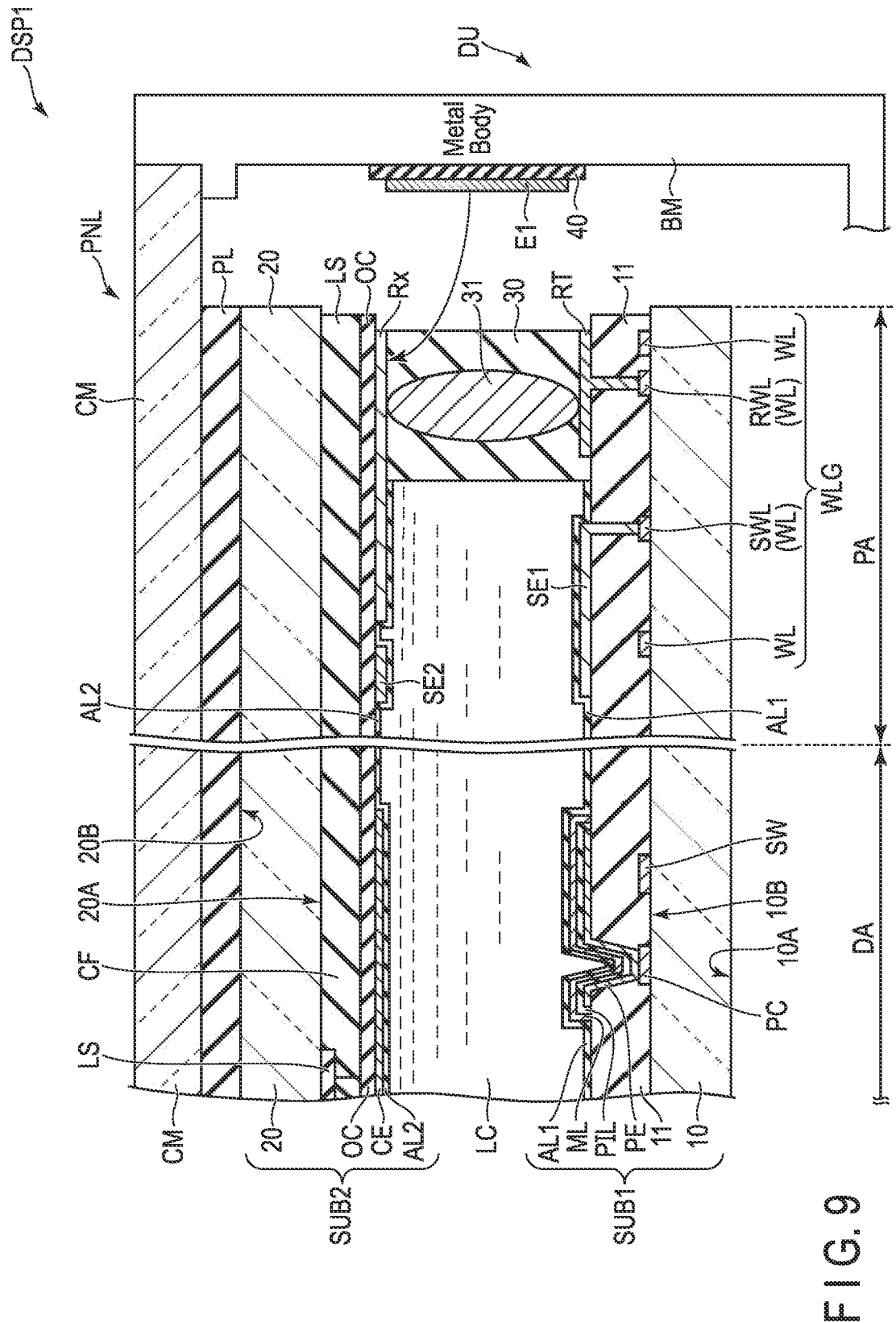
F I G. 9

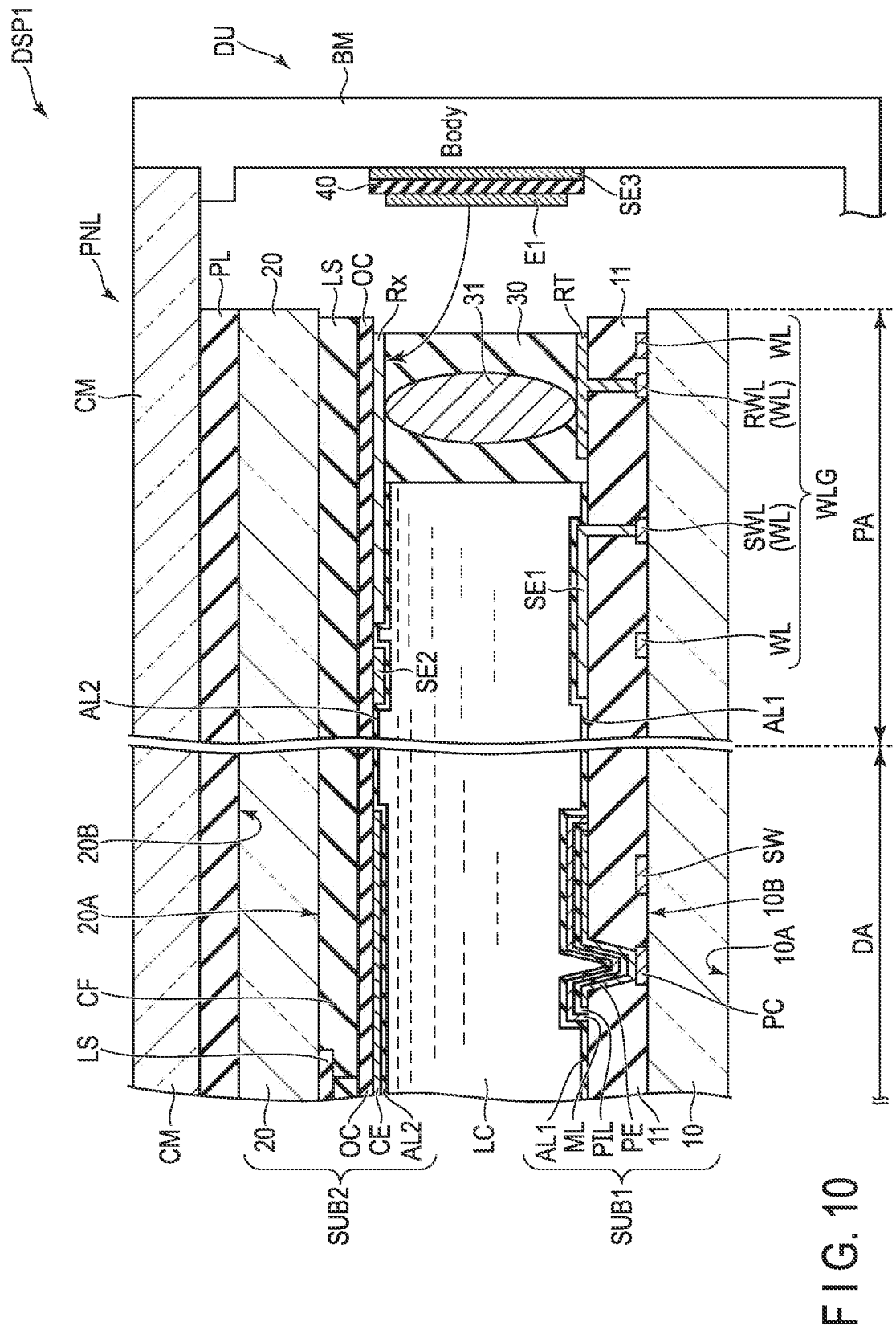
F I G. 10

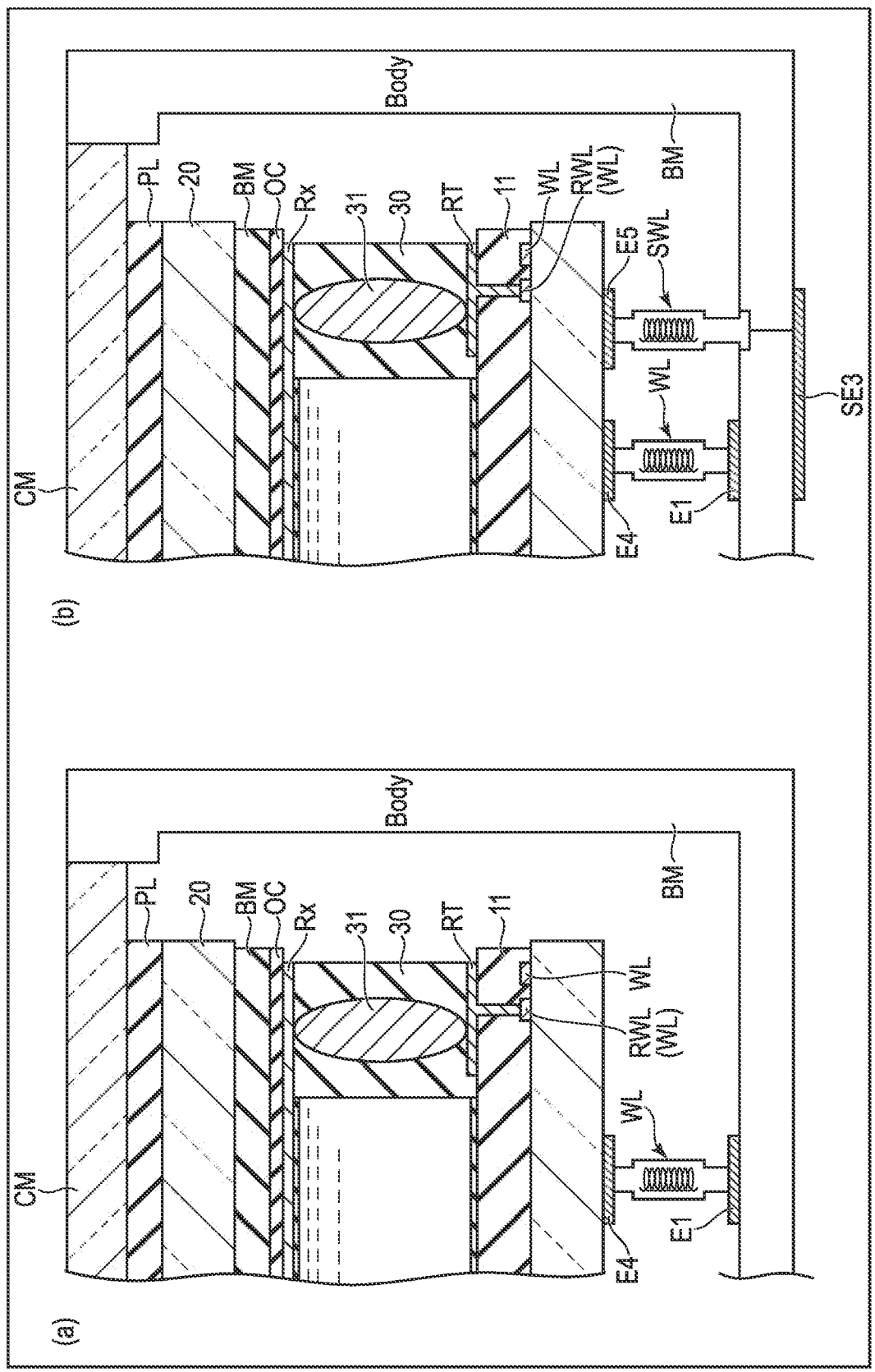
F I G. 18

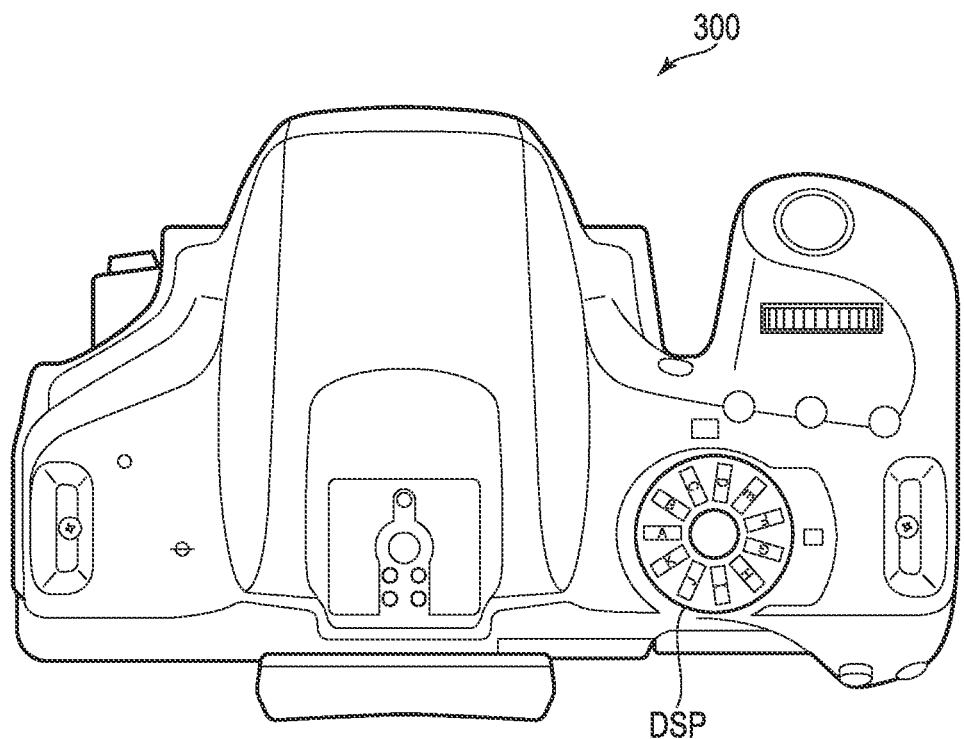
F I G. 21
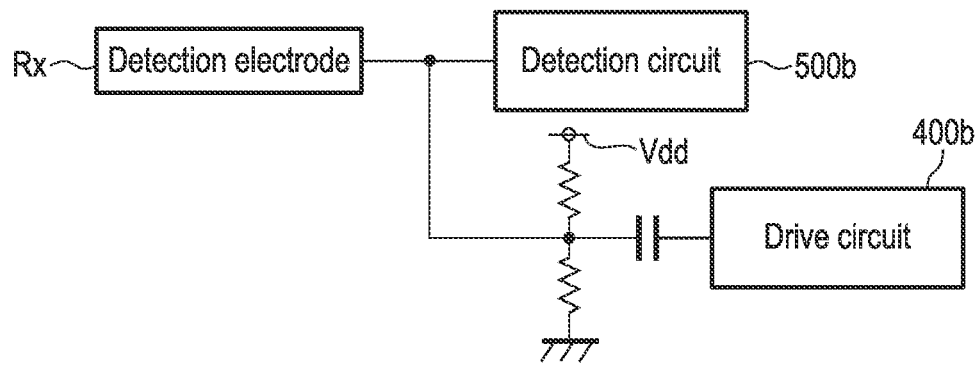
F I G. 22

DISPLAY DEVICE

CROSS-REFERENCE TO RELATED APPLICATIONS

This application is based upon and claims the benefit of priority from Japanese Patent Application No. 2022-037168, filed Mar. 10, 2022, the entire contents of which are incorporated herein by reference.

FIELD

Embodiments described herein relate generally to a display device.

BACKGROUND

In recent years, display devices with a touch detection function have been widespread. In many cases, a touch sensor is disposed in a display area for displaying an image and detects a touch on the display area to implement various operations. However, such a display device has a problem that operability is deteriorated when the display area for displaying an image is small.

BRIEF DESCRIPTION OF THE DRAWINGS

FIG. 1 is a plan view showing a configuration example of a display device according to a first embodiment.

FIG. 2 is a timing chart for explaining an operation example of a touch controller according to the embodiment.

FIG. 8 is a cross-sectional view showing a cross section of the display device taken along line A-B shown in FIG. 1.

FIG. 9 is a cross-sectional view showing another configuration example of the display device according to the embodiment.

FIG. 10 is a cross-sectional view showing still another configuration example of the display device according to the embodiment.

FIG. 18 is cross-sectional views showing configuration examples of the display device according to the embodiment.

FIG. 21 is a view showing still another application example of the display device according to each embodiment.

FIG. 22 is a diagram for describing an example of a principle of touch detection by self capacitive sensing.

DETAILED DESCRIPTION

Figure 3:
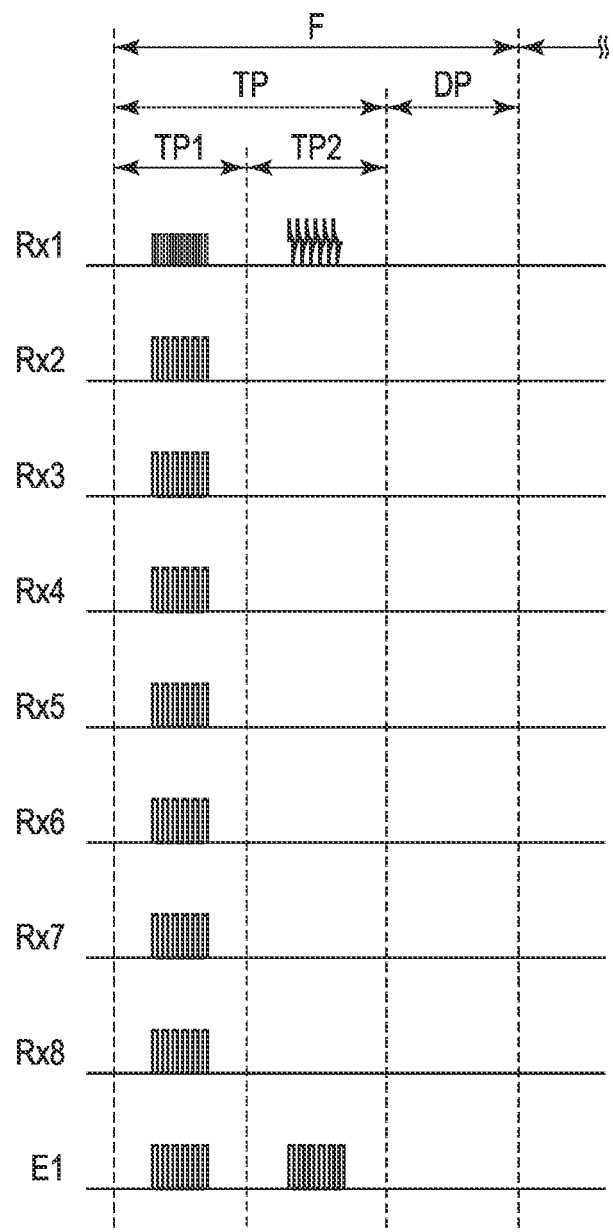
FIG. 3 is a timing chart for explaining another operation example of the touch controller according to the embodiment.

In general, according to one embodiment, a display device includes a display area for displaying an image, a plurality of detection electrodes and a movable electrode. The plurality of detection electrodes are disposed in a peripheral area surrounding the display area. The movable electrode is disposed in such a way as to surround the detection electrodes and is movable around the detection electrodes. The movable electrode has a length corresponding to a length of each of the detection electrodes in a peripheral direction.

Embodiments will be described hereinafter with reference to the accompanying drawings.

Note that the disclosure is merely an example, and proper changes within the spirit of the invention, which are easily conceivable by a skilled person, are included in the scope of the invention as a matter of course. In addition, in some cases, in order to make the description clearer, the drawings are schematically illustrated compared to the actual modes. However, the schematic illustration is merely an example, and adds no restrictions to the interpretation of the invention. Besides, in the specification and drawings, the same elements as those described in connection with preceding drawings are denoted by like reference numerals, and a detailed description thereof is omitted unless otherwise necessary.

In each embodiment, a display device with a touch detection function will be described as an example of a display device. A touch detection method includes various methods such as optical sensing, resistance sensing, electrostatic capacitance sensing, and electromagnetic induction sensing. Among the various detection methods described above, the electrostatic capacitance sensing is a detection method using a change in electrostatic capacitance due to an approach or contact of an object (for example, a finger), and has advantages that it can be implemented with a relatively simple structure, that energy consumption is small, and the like. In each embodiment, a display device with a touch detection function using electrostatic capacitance sensing will be mainly described.

Note that the electrostatic capacitance sensing includes mutual capacitive sensing in which an electric field is generated between a pair of a transmission electrode (drive electrode) and a reception electrode (detection electrode) disposed in a state of being spaced apart from each other, and a change in electric field due to an approach or contact of an object is detected, and self capacitive sensing in which a change in electrostatic capacitance due to an approach or contact of an object is detected using a single electrode.

First Embodiment

FIG. 1 is a plan view schematically showing a configuration example of a display device DSP1 according to the first embodiment. For example, a first direction X, a second direction Y and a third direction Z are orthogonal to each other, but they may intersect at an angle other than 90 degrees. The first direction X and the second direction Y correspond to the directions parallel to a main surface of a substrate that constitutes the display device DSP1, and the third direction Z is equivalent to a thickness direction of the display device DSP1. A direction forwarding a tip of an arrow indicating the third direction Z is referred to as "upward" and a direction forwarding oppositely from the tip of the arrow is referred to as "downward". With such expressions "a second member above a first member" and "a second member below a first member", the second member may be in contact with the first member or may be remote from the first member. In addition, it is assumed that an observation position from which the display device DSP is observed is located on the tip side of the arrow indicating the third direction Z, and viewing from the observation position toward an X-Y plane defined by the first direction X and the second direction Y is referred to as "planar view".

As shown in FIG. 1, a display device DSP1 includes a display panel PNL, a dial portion DU, a flexible printed circuit board FPC, and a circuit board PCB. The display panel PNL and the circuit board PCB are electrically connected via the flexible printed circuit board FPC. More specifically, a terminal T of the display panel PNL and a connector CN of the circuit board PCB are electrically connected via the flexible printed circuit board FPC.

The display panel PNL includes a display area DA for displaying an image and a frame-shaped peripheral area PA surrounding the display area DA. The display area DA may also be referred to as a display portion. The peripheral area PA may be referred to as a peripheral portion, a frame portion, or a non-display portion. Pixels PX are disposed in the display area DA. Specifically, in the display area DA, a large number of pixels PX are arranged in a matrix form in the first direction X and the second direction Y.

In the present embodiment, the pixel PX includes sub-pixels SP of red (R), green (G), and blue (B). In addition, each sub-pixel SP includes a plurality of segment pixels SG. Each segment pixel SG includes pixel electrodes having different sizes, and as switching between display and non-display of the plurality of segment pixels SG is performed, gradation is formed for each sub-pixel SP.

As shown in an enlarged manner in FIG. 1, the segment pixel SG includes a switching element SW, a pixel circuit PC, a pixel electrode PE, a common electrode CE, a liquid crystal layer LC, and the like.

The switching element SW includes, for example, a thin-film transistor (TFT), and is electrically connected to a scanning line G and a signal line S. The scanning line G is electrically connected to the switching element SW in each of the segment pixels SG arranged in the first direction X. The signal line S is electrically connected to the switching element SW in each of the segment pixels SG arranged in the second direction Y.

The pixel electrode PE is electrically connected to the switching element SW via the pixel circuit PC. Each pixel electrode PE faces the common electrode CE and drives the liquid crystal layer LC by an electric field generated between the pixel electrode PE and the common electrode CE. In the present embodiment, the configuration in which the pixel electrode PE is electrically connected to the switching element SW via the pixel circuit PC is described by way of example, but the pixel electrode PE may be electrically connected to the switching element SW without via the pixel circuit PC.

Among a plurality of concentric circles shown in FIG. 1, an area of a circle located on the innermost side corresponds to the display area DA, and an area between the circle located on the innermost side and a circle located on the outermost side corresponds to the peripheral area PA. In other words, a hatched area in FIG. 1 corresponds to the display area DA, and other areas correspond to the peripheral area PA.

In the present embodiment, a case where the display area DA has a circular shape, and the peripheral area PA surrounding the display area DA also has a similar shape is described by way of example. However, the present invention is not limited thereto. The display area DA does not have to have a circular shape, and the peripheral area PA may have a shape different from the display area DA. For example, the display area DA and the peripheral area PA may have a polygonal shape. Further, in a case where the display area DA has a polygonal shape, the peripheral area PA may have a circular shape which is different from that of the display area DA.

As shown in FIG. 1, in the peripheral area PA, a plurality of detection electrodes Rx1 to Rx8 are disposed in such a way as to surround the display area DA. In FIG. 1, eight detection electrodes Rx1 to Rx8 are shown, but the number of detection electrodes Rx disposed in the peripheral area PA is not limited thereto, and any number of detection electrodes Rx may be disposed in such a way as to surround the display area DA. In addition, although FIG. 1 shows a case where the plurality of detection electrodes Rx1 to Rx8 have a polygonal shape, the present invention is not limited thereto. For example, the plurality of detection electrodes Rx1 to Rx8 may have an arc shape or any other shape.

The plurality of detection electrodes Rx1 to Rx8 are electrically connected to the terminal T disposed in the peripheral area PA via a Rx wiring line (not shown). The Rx wiring line extends, for example, along outer peripheries of the detection electrodes Rx1 to Rx8. The Rx wiring line is a wiring line used for outputting detection signals (RxAFE signals) from the detection electrodes Rx1 to Rx8.

As shown in FIG. 1, in the peripheral area PA, an annular first shielding electrode SE1 and an annular second shielding electrode SE2 are disposed in such a way as to surround the display area DA. Although details will be described later, the second shielding electrode SE2 is disposed in the same layer as the detection electrodes Rx1 to Rx8, and the first shielding electrode SE1 is disposed below the second shielding electrode SE2 and the detection electrodes Rx1 to Rx8. In planar view, the second shielding electrode SE2 is interposed between the display area DA and the detection electrodes Rx1 to Rx8. In planar view, the first shielding electrode SE1 overlaps the second shielding electrode SE2 and parts of the detection electrodes Rx1 to Rx8. A GND voltage or a predetermined DC voltage (fixed potential) is applied to the first shielding electrode SE1 and the second shielding electrode SE2 via a shielding wiring line (not shown).

As shown in FIG. 1, the annular dial portion DU is disposed outside the display panel PNL in such a way as to surround the detection electrodes Rx1 to Rx8 in planar view. The dial portion DU is rotatable clockwise or counterclockwise around the detection electrodes Rx1 to Rx8. A movable electrode E1 is disposed in the dial portion DU. The movable electrode E1 can move clockwise or counterclockwise as the dial portion DU rotates clockwise or counterclockwise. The movable electrode E1 is electrically connected to the terminal T disposed in the peripheral area PA via a Tx wiring line (not shown). The Tx wiring line is a wiring line used for supplying a drive signal Tx to the movable electrode E1. A length of the movable electrode E1 in a peripheral direction (circumferential direction) is smaller (shorter) than a length of the detection electrode Rx in the peripheral direction (circumferential direction).

As shown in FIG. 1, the circuit board PCB is provided with a touch controller TC, a display controller DC, a central processing unit (CPU) 1, and the like. The touch controller TC may also be referred to as a detector.

Here, an example of operation of the touch controller TC will be described with reference to FIG. 2.

As shown in FIG. 2, one frame period F includes a touch period TP for detecting a touch and a display period DP for displaying an image. The touch period TP further includes a first period TP1 for detecting an approach or contact of an external approaching object (for example, a finger) by the self capacitive sensing and a second period TP2 for detecting an approach of the movable electrode E1 by the mutual capacitive sensing. The first period TP1 may be referred to as a finger detection period. The second period TP2 may be referred to as a movable electrode detection period. In FIG. 2, waveforms of signals output from the detection electrodes Rx1 to Rx8 are illustrated in rows corresponding to the reference signs Rx1 to Rx8, and waveforms of signals supplied to the movable electrode E1 are illustrated in rows corresponding to the reference sign E1.

Once the first period TP1 starts, the touch controller TC detects an approach or contact of an external approaching object by the self capacitive sensing. A detection signal having a predetermined waveform is output from the detection electrode Rx to the touch controller TC according to a change in capacitance value. The detection signal output from the detection electrode Rx when the external approaching object approaches or comes into contact shows a waveform different from that of the detection signal output from the detection electrode Rx when the external approaching object does not approach or come into contact. In a case where the waveform of the detection signal is different from the waveform of the detection signal when the external approaching object does not approach or come into contact, the touch controller TC detects that the external approaching object approaches to or comes into contact with the detection electrode Rx that has output the detection signal. In FIG. 2, it is assumed that an external approaching object does not approach or come into contact with the detection electrode Rx.

In the first period TP1, a signal Tx for driving in phase with the detection electrodes Rx1 to Rx8 is supplied from the touch controller TC to the movable electrode E1. With this configuration, the plurality of detection electrodes Rx1 to Rx8 and the movable electrode E1 can be driven in phase in the first period TP1, it is thus possible to reduce (cancel) a parasitic capacitance that can be formed between the detection electrodes Rx and the movable electrode E1.

Once the first period TP1 ends and the second period TP2 starts, the touch controller TC detects an approach of the movable electrode E1 by the mutual capacitive sensing. The touch controller TC outputs the drive signal Tx to the movable electrode E1 and receives a detection signal output from the detection electrode Rx close to the movable electrode E1. In other words, the touch controller TC detects that the movable electrode E1 approaches to the detection electrode Rx that has output the detection signal. In FIG. 2, since it is assumed that the movable electrode E1 moves around the detection electrodes Rx1 to Rx8 sequentially, detection signals are sequentially output from the detection electrodes Rx1 to Rx8.

FIG. 2 illustrates a case where the detection signals are output from the plurality of detection electrodes Rx1 to Rx8 to the touch controller TC in a time division manner, but the present invention is not limited thereto. For example, as shown in FIG. 3, the detection signals may be simultaneously output from the plurality of detection electrodes Rx1 to Rx8 to the touch controller TC. In FIG. 3, a case where the external approaching object is located on the detection electrode Rx1 in the first period TP1 in which an approach or contact of an external approaching object is detected by the self capacitive sensing is assumed, and thus, the detection signal output from the detection electrode Rx1 shows a waveform different from the detection signals output from the detection electrodes Rx2 to Rx8 to or with which the external approaching object does not approach or come into contact. More specifically, the waveform of the detection signal output from the detection electrode Rx1 is smaller in amplitude than the waveforms of the detection signals output from the detection electrodes Rx2 to Rx8. In FIG. 3, a case where the movable electrode E1 stops near the detection electrode Rx1 and does not move in the second period TP2 in which an approach of the movable electrode E1 is detected by the mutual capacitive sensing is assumed, the detection signal is output only from the detection electrode Rx1.

Figure 4:
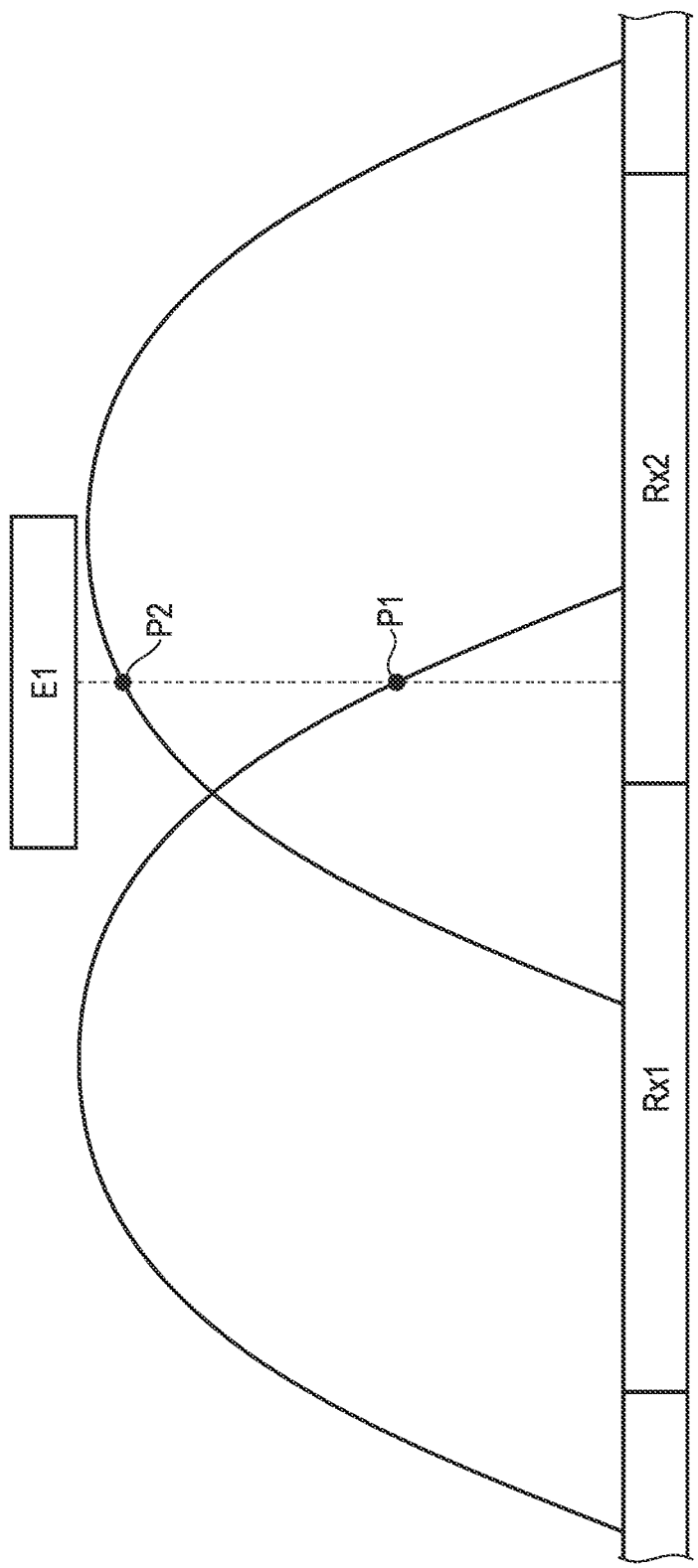
FIG. 4 is a diagram for describing a method of detecting a position of a movable electrode according to the embodiment.

In FIGS. 2 and 3, for convenience of description, the detection signal is output from one detection electrode Rx to which the movable electrode E1 approaches in the second period TP2, but actually, the detection signals having intensities corresponding to distances to the movable electrode E1 are output from the plurality of detection electrodes Rx to which the movable electrode E1 approaches. For example, as shown in FIG. 4, it is assumed that the movable electrode E1 approaches to two detection electrodes Rx1 and Rx2 and is closer to the detection electrode Rx2 than to the detection electrode Rx1. The intensity of the detection signal output from the detection electrode Rx increases as the movable electrode E1 approaches to the center of the detection electrode Rx and decreases as the movable electrode E1 moves away from the center of the detection electrode Rx as schematically shown by the waveform in FIG. 4. Therefore, as shown in FIG. 4, when the movable electrode E1 approaches to two detection electrodes Rx1 and Rx2 and is closer to the detection electrode Rx2 than to the detection electrode Rx1, the detection signal having an intensity indicated by a point P1 in FIG. 4 (in other words, a low-intensity detection signal) is output from the detection electrode Rx1, and a detection signal having an intensity indicated by a point P2 in FIG. 4 (in other words, a high-intensity detection signal) is output from the detection electrode Rx2. The touch controller TC can detect a position of the movable electrode E1 by recognizing the intensity of the detection signal output from the detection electrode Rx. The touch controller TC can detect a rotation angle of the movable electrode E1 (a rotation angle of the dial portion DU) by recognizing a time-series change in position of the movable electrode E1.

The description returns to FIG. 1 again. The display controller DC outputs a video signal indicating an image to be displayed in the display area DA in the display period DP alternately repeated with the touch period TP including the first period TP1 and the second period TP2.

The CPU 1 outputs a synchronization signal that defines operation timings of the touch controller TC and the display controller DC, executes an operation corresponding to a touch detected by the touch controller TC, and the like.

Figure 5:
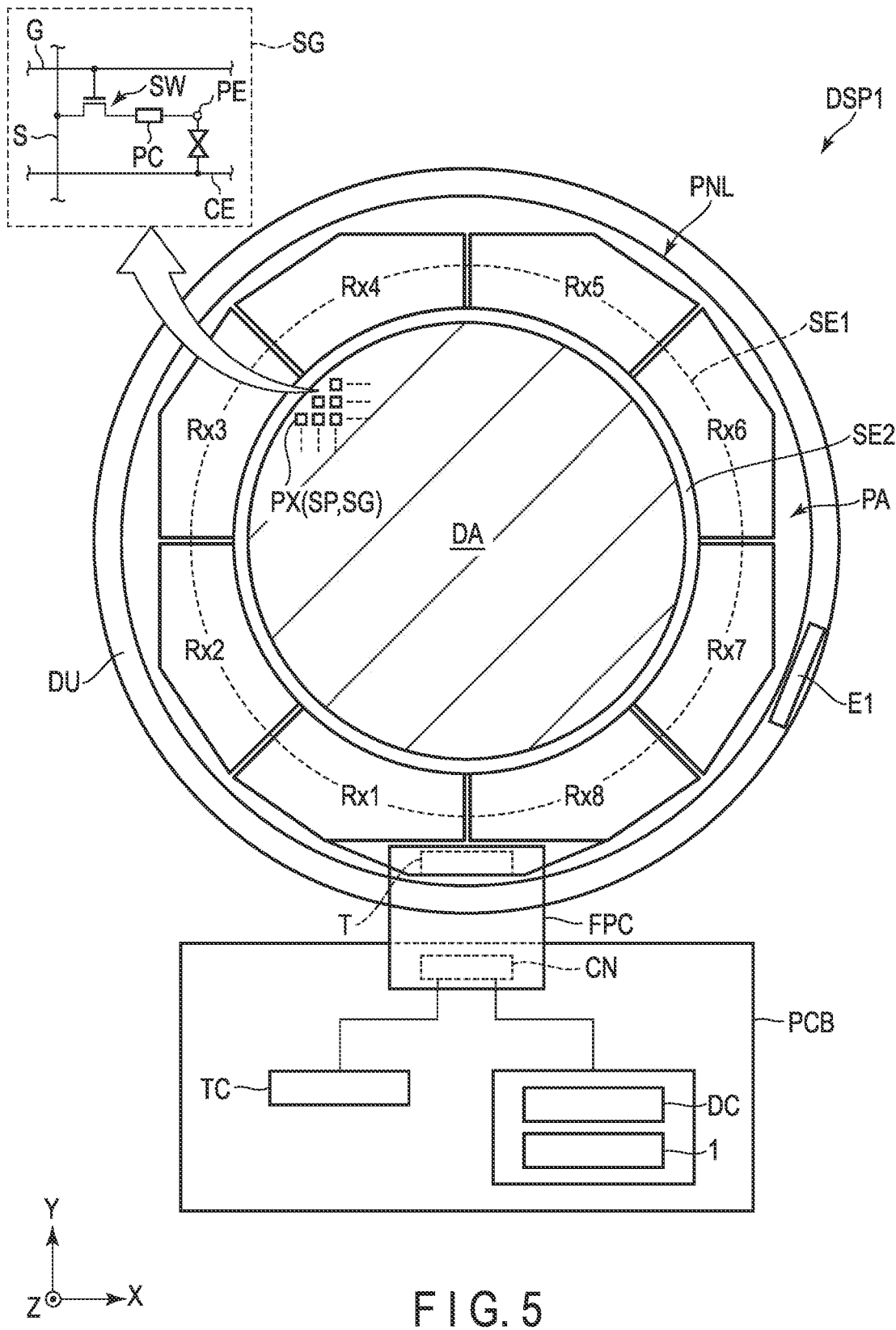
FIG. 5 is a plan view showing another configuration example of the display device according to the embodiment.
Figure 6:
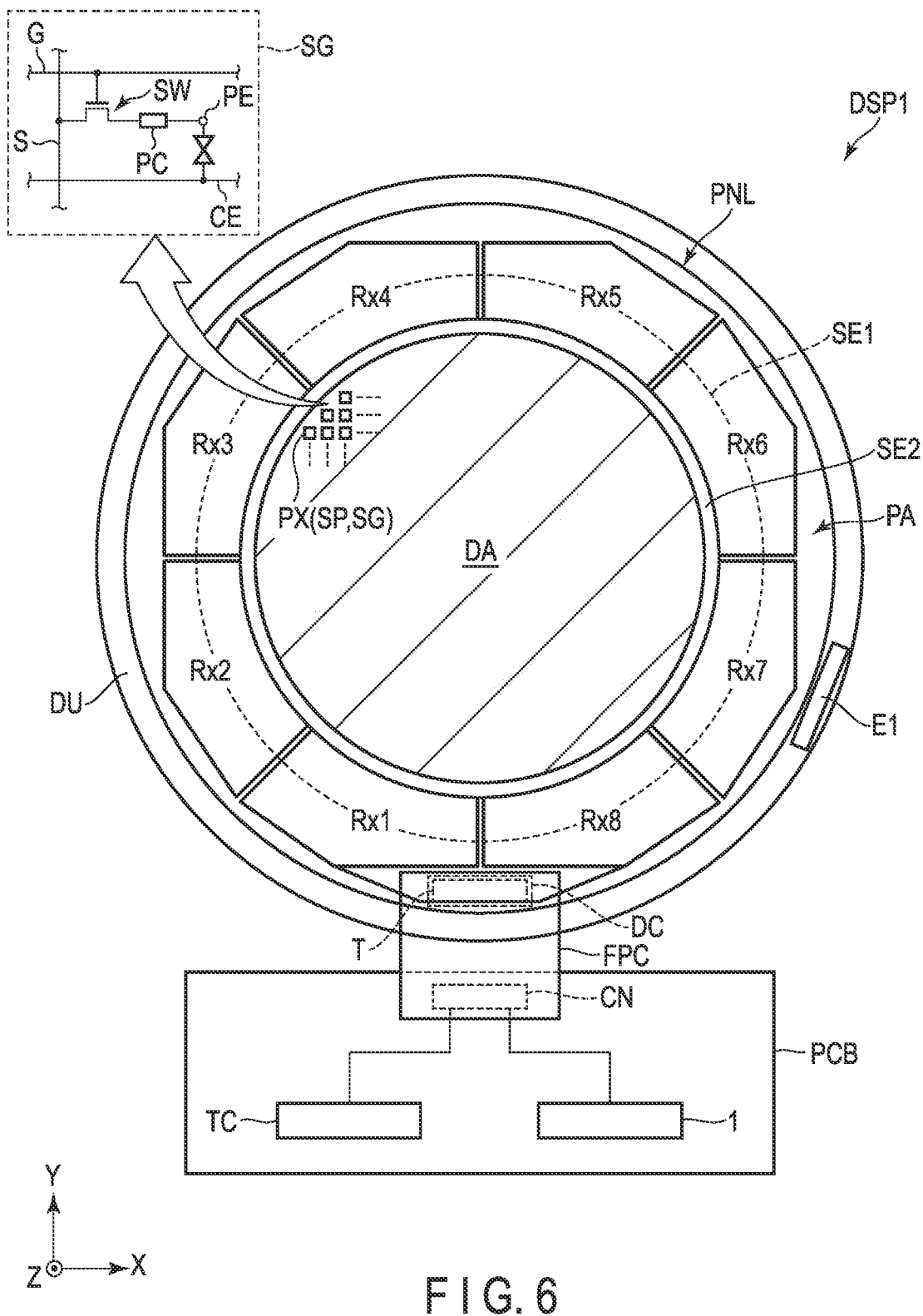
FIG. 6 is a plan view showing still another configuration example of the display device according to the embodiment.
Figure 7:
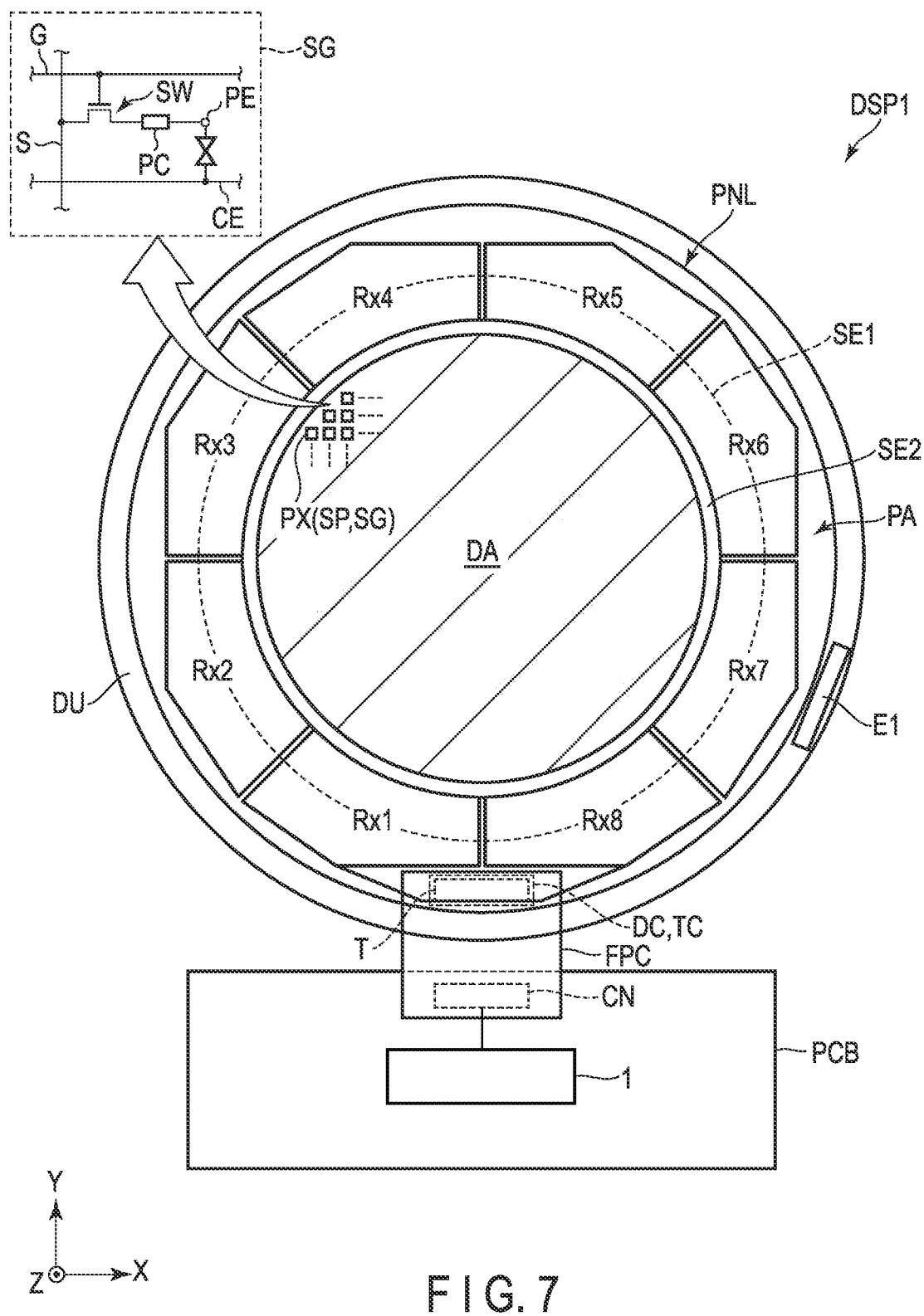
FIG. 7 is a plan view showing still another configuration example of the display device according to the embodiment.

FIG. 1 illustrates a case where the touch controller TC, the display controller DC, and the CPU 1 are implemented by one semiconductor chip. However, the mounting mode thereof is not limited thereto. For example, as shown in FIG. 5, each member may be mounted on the circuit board PCB while only the touch controller TC is separated. Alternatively, as shown in FIG. 6, the touch controller TC and the CPU 1 may be separately mounted on the circuit board PCB, and the display controller DC may be mounted on the display panel PNL by chip on glass (COG). Alternatively, as shown in FIG. 7, only the CPU 1 may be mounted on the circuit board PCB, and the touch controller TC and the display controller DC may be mounted on the display panel PNL by COG.

FIG. 8 is a cross-sectional view showing a cross section of the display device DSP1 taken along line A-B shown in FIG. 1. Hereinafter, the display panel PNL will be described separately for a configuration on a display area DA side and a configuration on a peripheral area PA side.

The display device DSP1 includes the display panel PNL and the dial portion DU. The display panel PNL includes a first substrate SUB1, a second substrate SUB2, a sealant 30, the liquid crystal layer LC, a polarizer PL, and a cover member CM. The first substrate SUB1 may be referred to as an array substrate, and the second substrate SUB2 may be referred to as a counter-substrate. The first substrate SUB1 and the second substrate SUB2 are formed in a flat plate shape parallel to an X-Y plane.

The first substrate SUB1 and the second substrate SUB2 overlap each other in planar view, and are bonded (connected) by the sealant 30. The liquid crystal layer LC is held between the first substrate SUB1 and the second substrate SUB2 and is sealed by the sealant 30. The sealant 30 includes a large number of conductive pearls 31 coated with metal, whereby a configuration on a first substrate SUB1 side and a configuration on a second substrate SUB2 side are electrically connected.

The polarizer PL is provided on the second substrate SUB2, and the cover member CM is further provided on the polarizer PL.

The dial portion DU is rotatably connected to a side surface of the cover member CM. The dial portion DU is rotatable clockwise and counterclockwise along the side surface of the cover member CM. A detailed configuration of the dial portion DU will be described later.

FIG. 8 illustrates a case where the display device DSP1 is a reflective type display device in which a backlight unit is not disposed, but the present invention is not limited thereto, and the display device DSP1 may be a display device employing organic EL as a pixel or a transmissive type display device in which the backlight unit is disposed. Alternatively, the display device DSP1 may be a display device in which the reflective type and the transmissive type are combined. As the backlight unit, various forms of backlight units can be used, and for example, a backlight unit using a light-emitting diode (LED) as a light source, a backlight unit using a cold-cathode fluorescent tube (CCFL), and the like can be used. In a case where the backlight unit is disposed, a polarizer is interposed between the first substrate SUB1 and the backlight unit (in other words, below the first substrate SUB1).

On the display area DA side, as shown in FIG. 8, the first substrate SUB1 includes a transparent substrate 10, the switching element SW, the pixel circuit PC, a planarization film 11, the pixel electrode PE, an interlayer insulating film PIL, a metal layer ML, and an alignment film AL1. The first substrate SUB1 includes the scanning line G, the signal line S, and the like shown in FIG. 1 in addition to the above-described configuration, but these are not shown in FIG. 8.

The transparent substrate 10 includes a surface (lower surface) 10A and a surface (upper surface) 10B opposite to the surface 10A. The switching element SW and the pixel circuit PC are disposed on the surface 10B. The planarization film 11 includes at least one insulating film and covers the switching element SW and the pixel circuit PC.

The pixel electrode PE is disposed on the planarization film 11 and is connected to the pixel circuit PC via a contact hole formed in the planarization film 11. The switching element SW, the pixel circuit PC, and the pixel electrode PE are disposed for each segment pixel SG. The pixel electrode PE is covered with the interlayer insulating film PIL. The metal layer ML is provided on the interlayer insulating film PIL. The alignment film AL1 covers the planarization film 11 and the metal layer ML and is in contact with the liquid crystal layer LC.

In FIG. 8, the switching element SW and the pixel circuit PC are shown in a simplified manner, but actually, the switching element SW and the pixel circuit PC include a semiconductor layer and an electrode of each layer. Although not shown in FIG. 8, the switching element SW and the pixel circuit PC are electrically connected. Furthermore, as described above, the scanning line G and the signal line S that are not shown in FIG. 8 are interposed between the transparent substrate 10 and the planarization film 11, for example.

On the display area DA side, as shown in FIG. 8, the second substrate SUB2 includes a transparent substrate 20, a light-shielding film LS, a color filter CF, an overcoat layer OC, the common electrode CE, and an alignment film AL2.

The transparent substrate 20 includes a surface (lower surface) 20A and a surface (upper surface) 20B opposite to the surface 20A. The surface 20A of the transparent substrate 20 faces the surface 10B of the transparent substrate 10. The light-shielding film LS partitions the segment pixels SG. The color filter CF is disposed on the surface 20A of the transparent substrate 20, faces the pixel electrode PE, and partially overlaps the light-shielding film LS. The color filter CF includes a red color filter, a green color filter, a blue color filter, and the like. The overcoat layer OC covers the color filter CF.

The common electrode CE is disposed across the plurality of segment pixels SG (the plurality of pixels PX) and faces the plurality of pixel electrodes PE in the third direction Z. The common electrode CE is disposed under the overcoat layer OC. The alignment film AL2 covers the overcoat layer OC and the common electrode CE and is in contact with the liquid crystal layer LC.

The liquid crystal layer LC is interposed between the surface 10B and the surface 20A.

The transparent substrates 10 and 20 are, for example, insulating substrates such as glass bases and plastic substrates. The planarization film 11 is formed of a transparent insulating material such as silicon oxide, silicon nitride, silicon oxynitride, or acrylic resin. For example, the planarization film 11 includes an inorganic insulating film and an organic insulating film.

The pixel electrode PE is a transparent electrode formed of a transparent conductive material such as indium tin oxide (ITO) or indium zinc oxide (IZO). The metal layer ML is formed of, for example, silver (Ag) or the like. Instead of providing the metal layer ML on the pixel electrode PE, the pixel electrode PE itself may be formed as a reflecting electrode. In this case, the pixel electrode PE is formed in a three-layer stacked structure of, for example, indium zinc oxide (IZO), silver (Ag), and indium zinc oxide (IZO). The common electrode CE is a transparent electrode formed of a transparent conductive material such as indium tin oxide (ITO) or indium zinc oxide (IZO).

The alignment films AL1 and AL2 are horizontal alignment films having an alignment restriction force substantially parallel to the X-Y plane. The alignment restriction force may be applied by rubbing treatment or photo-alignment treatment.

On the peripheral area PA side, as shown in FIG. 8, the first substrate SUB1 includes the transparent substrate 10, a wiring line group WLG including a plurality of wiring lines WL, the planarization film 11, the first shielding electrode SE1, an Rx terminal portion RT, and the alignment film AL1. Hereinafter, a detailed description of the already described configuration on the display area DA side will be omitted.

The wiring line group WLG including the plurality of wiring lines WL is disposed on the surface 10B of the transparent substrate 10. The plurality of wiring lines WL included in the wiring line group WLG are covered with the planarization film 11. In FIG. 8, four wiring lines WL including a shielding wiring line SWL and a Rx wiring line RWL are shown as the plurality of wiring lines WL included in the wiring line group WLG, but the number of wiring lines WL included in the wiring line group WLG is not limited thereto. The plurality of wiring lines WL included in the wiring line group WLG may further include the signal line S, a wiring line for supplying power to the common electrode CE, and the like.

The first shielding electrode SE1 is provided on the planarization film 11. The first shielding electrode SE1 is connected to the shielding wiring line SWL, which is one of the wiring lines included in the wiring line group WLG, via the contact hole formed in the planarization film 11. The first shielding electrode SE1 faces at least some of the plurality of wiring lines WL included in the wiring line group WLG, and is disposed in such a way as to be located between the wiring line group WLG and the detection electrode Rx in the third direction Z. The first shielding electrode SE1 is disposed in the same layer as the pixel electrode PE on the display area DA side, and is formed of, for example, the same transparent conductive material as the pixel electrode PE.

A GND voltage or a predetermined DC voltage (fixed potential) is applied to the first shielding electrode SE1 via the shielding wiring line SWL. With this configuration, the first shielding electrode SE1 can suppress the detection electrode Rx from being capacitively coupled to other configurations (for example, the plurality of wiring lines WL included in the wiring line group WLG).

The Rx terminal portion RT is provided on the planarization film 11. The Rx terminal portion RT is provided at a position overlapping the sealant 30 in planar view and is connected to the Rx wiring line RWL, which is one of the wiring lines included in the wiring line group WLG, via the contact hole formed in the planarization film 11. The Rx terminal portion RT is electrically connected to the detection electrode Rx provided on the second substrate SUB2 side by the conductive pearls 31 included in the sealant 30.

The alignment film AL1 covers the planarization film 11 and is in contact with the liquid crystal layer LC in an area where the liquid crystal layer LC is disposed in the peripheral area PA.

On the peripheral area PA side, as shown in FIG. 8, the second substrate SUB2 includes the transparent substrate 20, the light-shielding film LS, the overcoat layer OC, the second shielding electrode SE2, the detection electrode Rx, and the alignment film AL2. Hereinafter, a detailed description of the already described configuration on the display area DA side will be omitted.

The light-shielding film LS is disposed on the surface 20A of the transparent substrate 20. The light-shielding film LS is disposed over substantially the entire peripheral area PA. The overcoat layer OC covers the light-shielding film LS together with the color filter CF on the display area DA side.

As shown in FIG. 8, the second shielding electrode SE2 is disposed under the overcoat layer OC. The second shielding electrode SE2 extends to a position overlapping the sealant 30 in planar view in a cross section different from that in FIG. 8, and is electrically connected to a shielding wiring line (the shielding wiring line SWL shown in FIG. 8 or a shielding wiring line different from the shielding wiring line SWL) provided on the first substrate SUB1 side by the conductive pearls 31 included in the sealant 30. The conductive pearls 31 electrically connecting the second shielding electrode SE2 and the above-described shielding wiring line are electrically insulated from the conductive pearls 31 electrically connecting the detection electrode Rx and the Rx terminal portion RT. The second shielding electrode SE2 is disposed in the same layer as the common electrode CE on the display area DA side, and is formed of, for example, the same transparent conductive material as the common electrode CE.

A GND voltage or a predetermined DC voltage (fixed potential) is applied to the second shielding electrode SE2 via the above-described shielding wiring line. With this configuration, the second shielding electrode SE2 can suppress the detection electrode Rx from being capacitively coupled to other configurations (for example, the pixel electrode PE and the common electrode CE on the display area DA side).

As shown in FIG. 8, the detection electrode Rx is disposed under the overcoat layer OC. The detection electrode Rx is disposed in the same layer as the common electrode CE on the display area DA side, and is formed of, for example, the same transparent conductive material as the common electrode CE. The detection electrode Rx extends from an area where the sealant 30 is not disposed in the peripheral area PA (an area where the liquid crystal layer LC is disposed in the peripheral area PA) to an area where the sealant 30 is disposed, and is electrically connected to the Rx terminal portion RT and the Rx wiring line RWL disposed on the first substrate SUB1 side by the conductive pearls 31 included in the sealant 30.

The alignment film AL2 covers the overcoat layer OC and the detection electrode Rx in an area where the liquid crystal layer LC is disposed in the peripheral area PA, and is in contact with the liquid crystal layer LC.

The liquid crystal modes are classified into two modes according to a direction of application of the electric field for changing alignment of liquid crystal molecules included in the liquid crystal layer LC. In FIG. 8, a configuration in a case where a liquid crystal mode is a so-called vertical electric field mode is shown. However, this configuration is also applicable to a case where the liquid crystal mode is a so-called horizontal electric field mode. The above-described vertical electric field mode includes, for example, a twisted nematic (TN) mode, a vertical alignment (VA) mode, and the like. The horizontal electric field mode includes, for example, an in-plane switching (IPS) mode, a fringe field switching (FFS) mode which is one of the IPS modes, and the like. In a case where the horizontal electric field mode is employed, the common electrode CE provided in the display area DA is provided on the first substrate SUB1 side and faces the pixel electrode PE via a thin insulating layer. The detection electrode Rx is also provided on the first substrate SUB1 side similarly to the common electrode CE.

The dial portion DU is rotatably connected to a side surface of the cover member CM. As shown in FIG. 8, the dial portion DU includes a body member BM, a third shielding electrode SE3, an insulating base 40, and the movable electrode E1. The body member BM may be referred to as a housing.

The body member BM is rotatably connected to the side surface of the cover member CM. The body member BM surrounds a side surface and a lower surface of the display panel PNL. The body member BM is formed of an arbitrary material such as a resin material. The insulating base 40 is formed of an insulating material such as a glass base or a plastic substrate. The third shielding electrode SE3 and the movable electrode E1 are formed of an arbitrary conductive material such as a metal material.

The body member BM includes a surface BMA and a surface BMB opposite to the surface BMA. The third shielding electrode SE3, the insulating base 40, and the movable electrode E1 are sequentially stacked on the surface BMA of the body member BM. Each layer is disposed in parallel to the X-Y plane and is also disposed in parallel to the detection electrode Rx. The third shielding electrode SE3 is formed to be larger than the movable electrode E1 in planar view. Alternatively, the third shielding electrode SE3 is formed to have the same size as the movable electrode E1 in planar view. In other words, the third shielding electrode SE3 is opposed to the entire surface of the movable electrode E1 in planar view. Although details will be described later, a GND voltage or a predetermined DC voltage (fixed potential) is applied to the third shielding electrode SE3 via a shielding wiring line. Alternatively, a signal that is in phase with and has the same amplitude as the drive signal Tx supplied to the movable electrode E1 is supplied to the third shielding electrode SE3. With this configuration, the third shielding electrode SE3 can block a fringing field that reaches the detection electrode Rx from the movable electrode E1 via the outside of the dial portion DU as indicated by a broken line arrow in FIG. 8, for example. In other words, a fringing field that does not pass through the outside of the dial portion DU as indicated by a solid line arrow in FIG. 8 is formed between the movable electrode E1 and the detection electrode Rx. With this configuration, even when an external approaching object comes into contact with or approaches to an outer side (for example, an upper surface) of the dial portion DU in the second period TP2, there is no fringing field that can be affected by the external approaching object outside the dial portion DU, and thus, an approach of the movable electrode E1 and the rotation angle of the dial portion DU can be accurately detected without being affected by the external approaching object.

The configuration of the dial portion DU is not limited to the configuration shown in FIG. 8, and for example, as shown in FIG. 9, the body member BM may be formed of a metal material, the insulating base 40 may be provided on the side surface of the body member BM, and the movable electrode E1 may be disposed perpendicular to the detection electrode Rx, on the insulating base 40. With this configuration, the body member BM is formed of a metal material, and thus, a fringing field that reaches the detection electrode Rx from the movable electrode E1 via the outside (for example, a side surface) of the dial portion DU can be blocked by the body member BM. In other words, a fringing field that does not pass through the outside of the dial portion DU as indicated by a solid line arrow in FIG. 9 is formed between the movable electrode E1 and the detection electrode Rx. As a result, even with the configuration shown in FIG. 9, it is possible to obtain effects similar to those of the configuration shown in FIG. 8.

The configuration of the dial portion DU is not limited to the configurations shown in FIGS. 8 and 9, and for example, as shown in FIG. 10, the third shielding electrode SE3, the insulating base 40, and the movable electrode E1 may be sequentially stacked on the side surface of the body member BM. The third shielding electrode SE3 is formed to be larger than or equal in size to the movable electrode E1, and is opposed to the entire surface of the movable electrode E1. Even with this configuration, the third shielding electrode SE3 is disposed, and thus, a fringing field that reaches the detection electrode Rx from the movable electrode E1 via the outside (for example, the side surface) of the dial portion DU can be blocked by the third shielding electrode SE3. In other words, a fringing field that does not pass through the outside of the dial portion DU as indicated by a solid line arrow in FIG. 10 is formed between the movable electrode E1 and the detection electrode Rx. As a result, even with the configuration shown in FIG. 10, it is possible to obtain effects similar to those of the configurations shown in FIGS. 8 and 9.

Figure 11:
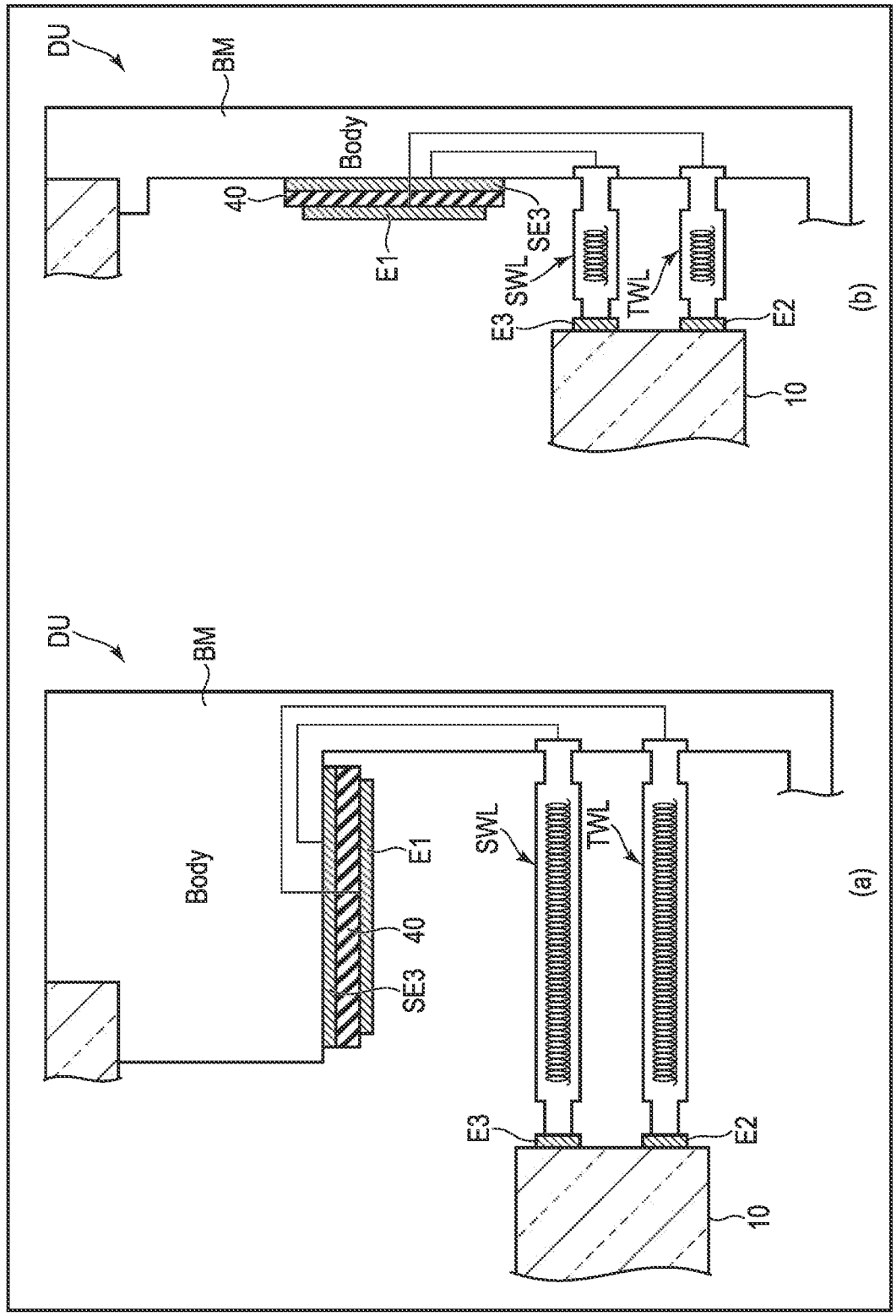
FIG. 11 is cross-sectional views showing configuration examples of the display device according to the embodiment.

FIG. 11 is a view for explaining wiring lines connected to the movable electrode E1 and the third shielding electrode SE3 disposed in the dial portion DU and shapes thereof. FIG. 11(*a*) is a view showing a case where the dial portion DU has the configuration shown in FIG. 8. FIG. 11(*b*) is a view showing a case where the dial portion DU has the configuration shown in FIG. 10.

The movable electrode E1 is connected to a Tx wiring line TWL, and the third shielding electrode SE3 is connected to the shielding wiring line SWL. The drive signal Tx is supplied to the movable electrode E1 via an electrode E2 and the Tx wiring line TWL. A GND voltage or a predetermined DC voltage (fixed potential) is supplied to the third shielding electrode SE3 via an electrode E3 and the shielding wiring line SWL. As shown in (a) and (b) of FIG. 11, both the Tx wiring line TWL and the shielding wiring line SWL include a spring portion (metal elastic body) formed of a metal material in a spring shape. The spring portion included in the Tx wiring line TWL is located between the electrode E2 and the side surface of the body member BM. The spring portion included in the shielding wiring line SWL is located between the electrode E3 and the side surface of the body member BM. Both the electrode E2 and the electrode E3 are disposed on the side surface of the transparent substrate 10 of the display panel PNL, and can move (rotate) on the side surface of the transparent substrate 10 when the dial portion DU rotates, for example. As the above-described the spring portion included in the Tx wiring line TWL is provided between the electrode E2 and the side surface of the body member BM and the spring portion is provided between the electrode E3 and the side surface of the body member BM. According to this, it is possible to cope with a structure in which a distance between the electrode E2 and the side surface of the body member BM varies depending on the location. Also, it is possible to cope with a structure in which a distance between the electrode E3 and the side surface of the body member BM varies depending on the location.

According to the first embodiment described above, since the display device DSP1 includes the dial portion DU including the movable electrode E1 outside the plurality of detection electrodes Rx1 to Rx8 disposed in such a way as to surround the display area DA, it is possible to detect not only an approach or contact of an external approaching object but also an approach of the movable electrode E1 in the detection electrodes Rx1 to Rx8. With this configuration, it is possible to cause the display device DSP1 to execute not only the operation according to the approach or contact of the external approaching object but also the operation according to the approach of the movable electrode E1.

In addition, the display device DSP1 can also detect the rotation angle of the movable electrode E1 (the rotation angle of the dial portion DU) by recognizing a time-series change in position of the movable electrode E1. As a result, it is possible to cause the display device DSP1 to execute an operation according to the rotation angle of the movable electrode E1 (the rotation angle of the dial portion DU). More specifically, the display device DSP1 can recognize the position of the movable electrode E1 in 16 stages such as a position corresponding to the detection electrode Rx1, a position between the detection electrodes Rx1 and Rx2, a position corresponding to the detection electrode Rx2, a position between the detection electrodes Rx2 and Rx3, a position corresponding to the detection electrode Rx3, . . . , and a position between the detection electrodes Rx8 and Rx1 by setting the length of the movable electrode E1 in the peripheral direction to be smaller than the length of each of the detection electrodes Rx1 to Rx8 in the peripheral direction, and can perform an operation of changing a specific parameter of the display device DSP1 in 16 stages. For example, the display device DSP1 can perform (1) an operation of changing a brightness of the display area DA by rotating the dial portion DU, (2) an operation of changing a volume of a sound output from the display device DSP1 by rotating the dial portion DU, and (3) an operation of changing a mode of the display device DSP1 by rotating the dial portion DU.

Second Embodiment

Next, a second embodiment will be described. In the first embodiment described above, a case where an approach or contact of an external approaching object is detected by the self capacitive sensing and an approach of the movable electrode E1 is detected by the mutual capacitive sensing has been described, but in the second embodiment, a case where both an approach or contact of an external approaching object and an approach of a movable electrode E1 are detected by the self capacitive sensing will be described. Hereinafter, first, two methods for detecting both an approach or contact of an external approaching object and an approach of the movable electrode E1 by the self capacitive sensing will be described.

A first method for detecting both an approach or contact of an external approaching object and an approach of the movable electrode E1 by the self capacitive sensing includes a method of applying a GND voltage or a predetermined DC voltage to the movable electrode E1. For example, it is assumed that a relationship "Cd>Cf" is established between these two capacitances. The capacitance Cf represents a capacitance formed between a detection electrode Rx and the external approaching object that approaches to or comes into contact with the detection electrode Rx. The capacitance Cd represents a capacitance formed between the detection electrode Rx and the movable electrode E1 that approaches to the detection electrode Rx. In this case, a touch controller TC can detect the approach of the movable electrode E1 by holding in advance a value larger than the capacitance Cf and smaller than the capacitance Cd as a threshold Cth and determining whether or not a capacitance detected by the detection electrode Rx is larger than the threshold Cth.

More specifically, in a case where the touch controller TC determines whether or not the capacitance detected by the detection electrode Rx is larger than Cf, and the capacitance is equal to or smaller than Cf, the touch controller TC detects that there is no approach or contact of the external approaching object and there is no approach of the movable electrode E1. On the other hand, in a case where the detected capacitance is larger than Cf, the touch controller TC determines whether or not the capacitance is larger than Cth. In a case where it is determined that the detected capacitance is equal to or smaller than Cth, the touch controller TC detects that the external approaching object approaches or comes into contact with the detection electrode Rx. On the other hand, in a case where the detected capacitance is larger than Cth, the touch controller TC detects that the movable electrode E1 approaches to the detection electrode Rx.

A second method for detecting both an approach or contact of an external approaching object and an approach of the movable electrode E1 by the self capacitive sensing includes a method of supplying a signal having an opposite phase to that of the detection electrode Rx (opposite phase signal) to the movable electrode E1. A charge amount Qf between the detection electrode Rx and the external approaching object that approaches to or comes into contact with the detection electrode Rx can be expressed as Cf*Vrx, and a charge amount Qd between the detection electrode Rx and the movable electrode E1 that approaches to the detection electrode Rx can be expressed as Cd*Vd, in which Vrx represents an amplitude of a detection signal, Vd represents an amplitude of the opposite phase signal, Cf represents a capacitance formed between the detection electrode Rx and the external approaching object that approaches to or comes into contact with the detection electrode Rx, and Cd represents a capacitance formed between the detection electrode Rx and the movable electrode E1 that approaches to the detection electrode Rx. Here, for example, in a case where a relationship "Qd>Qf" is established between these two charge amounts, the touch controller TC holds in advance a value larger than the charge amount Qf and smaller than the charge amount Qd as a threshold Qth, and determines whether or not a charge amount detected by the detection electrode Rx is larger than the threshold Qth, thereby detecting an approach of the movable electrode E1.

More specifically, in a case where the touch controller TC determines whether or not the charge amount detected by the detection electrode Rx is larger than Qf, and the charge amount is equal to or smaller than Qf, the touch controller TC detects that there is no approach or contact of the external approaching object and no approach of the movable electrode E1. On the other hand, in a case where the detected charge amount is larger than Qf, the touch controller TC determines whether or not the charge amount is larger than Qth. In a case where it is determined that the detected charge amount is equal to or smaller than Qth, the touch controller TC detects that the external approaching object approaches or comes into contact with the detection electrode Rx. On the other hand, in a case where the detected charge amount is larger than Qth, the touch controller TC detects that the movable electrode E1 approaches to the detection electrode Rx.

As the opposite phase signal is supplied to the movable electrode E1, the capacitance formed between the detection electrode Rx and the movable electrode E1 can be effectively increased.

Here, an example of an operation of the touch controller TC corresponding to the above-described first method will be described with reference to (a) and (b) of FIG. 12. Here, an example of an operation of the touch controller TC in a case where a finger, which is the external approaching object, is located on a detection electrode Rx4 while the movable electrode E1 approaches to a detection electrode Rx7 as shown in (a) of FIG. 12 will be described. As shown in (b) of FIG. 12, one frame period F includes a touch period TP for detecting an approach or contact of the external approaching object and an approach of the movable electrode E1, and a display period DP for displaying an image. In other words, the operation according to the present embodiment is different from the first embodiment described above in that the touch period TP is not divided into the first period TP1 and the second period TP2.

Once the touch period TP starts, the touch controller TC receives detection signals RxAFE1 to RxAFE8 output from the detection electrodes Rx1 to Rx8. In the first method, as shown in (b) of FIG. 12, a GND voltage or a predetermined DC voltage (fixed potential) is applied to the movable electrode E1, and a signal such as a drive signal is not supplied.

The touch controller TC determines whether or not a capacitance detected by the detection electrode Rx that has output the detection signal is larger than Cf based on the received detection signal, and further determines whether or not the capacitance is larger than Cth in a case where the capacitance is larger than Cf. In a case where it is determined that the detected capacitance is larger than Cth, the touch controller TC detects that the movable electrode E1 approaches to the detection electrode Rx as the determination target. On the other hand, in a case where it is determined that the detected capacitance is equal to or smaller than Cth, the touch controller TC detects that the external approaching object approaches to or comes into contact with the detection electrode Rx as the determination target.

Figure 12:
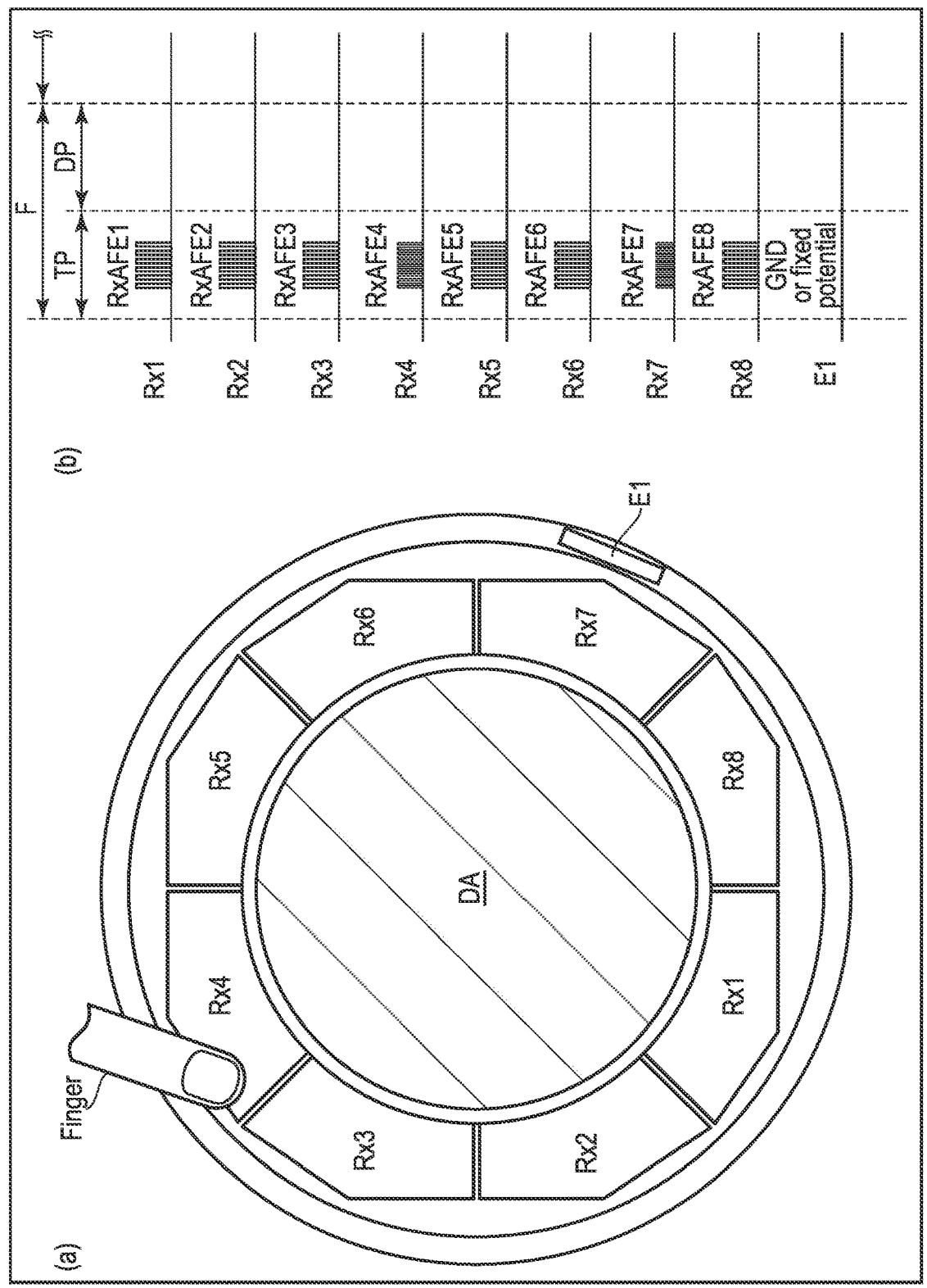
FIG. 12 is a view and a timing chart for explaining an operation example of a touch controller according to a second embodiment.

Here, it is assumed that the movable electrode E1 approaches to the detection electrode Rx7 as shown in (a) of FIG. 12. Therefore, in a case where the above-described series of processing is executed based on the detection signal RxAFE7 shown in (b) of FIG. 12, the touch controller TC detects that the capacitance detected by the detection electrode Rx7 is larger than Cth. As a result, the touch controller TC detects that the movable electrode E1 approaches to the detection electrode Rx7.

In addition, here, it is assumed that the finger which is the external approaching object is located on the detection electrode Rx4 as shown in (a) of FIG. 12. Therefore, in a case where the above-described series of processing is executed based on the detection signal RxAFE 4 shown in (b) of FIG. 12, the touch controller TC detects that the capacitance detected by the detection electrode Rx4 is larger than Cf and is equal to or smaller than Cth. As a result, the touch controller TC detects that the external approaching object approaches to or comes into contact with the detection electrode Rx4.

As shown in (b) of FIG. 12, a waveform of the detection signal RxAFE7 output from the detection electrode Rx7 to which the movable electrode E1 approaches has a smaller amplitude than waveforms of the detection signals output from the other detection electrodes Rx. In addition, the waveform of the detection signal RxAFE4 output from the detection electrode Rx4 to or with which the finger (the external approaching object) approaches or comes into contact has an amplitude that is larger than the waveform of the detection signal RxAFE7 output from the detection electrode Rx7 to which the movable electrode E1 approaches. On the other hand, the waveform of the detection signal RxAFE4 output from the detection electrode Rx4 to or with which the finger (the external approaching object) approaches or comes into contact has the amplitude that is smaller than the waveforms of the detection signals output from the detection electrodes Rx other than the detection electrode Rx7.

Next, an example of an operation of the touch controller TC corresponding to the above-described second method will be described with reference to (a) and (b) of FIG. 13. Here, an example of an operation of the touch controller TC in a case where a finger, which is the external approaching object, is located on a detection electrode Rx4 while the movable electrode E1 approaches to a detection electrode Rx7 as shown in (a) of FIG. 13 will be described. As shown in (b) of FIG. 13, one frame period F includes a touch period TP for detecting an approach or contact of the external approaching object and an approach of the movable electrode E1, and a display period DP for displaying an image.

Once the touch period TP starts, the touch controller TC receives detection signals RxAFE1 to RxAFE8 output from the detection electrodes Rx1 to Rx8. In the second method, as shown in (b) of FIG. 13, a signal having an opposite phase to that of a drive signal Tx is supplied to the movable electrode E1.

The touch controller TC determines whether or not a charge amount detected by the detection electrode Rx that has output the detection signal is larger than Qf based on the received detection signal, and further determines whether or not the charge amount is larger than Qth in a case where the charge amount is larger than Qf. In a case where it is determined that the detected charge amount is larger than Qth, the touch controller TC detects that the movable electrode E1 approaches to the detection electrode Rx as the determination target. On the other hand, in a case where it is determined that the detected charge amount is equal to or smaller than Qth, the touch controller TC detects that the external approaching object approaches to or comes into contact with the detection electrode Rx as the determination target.

Figure 13:
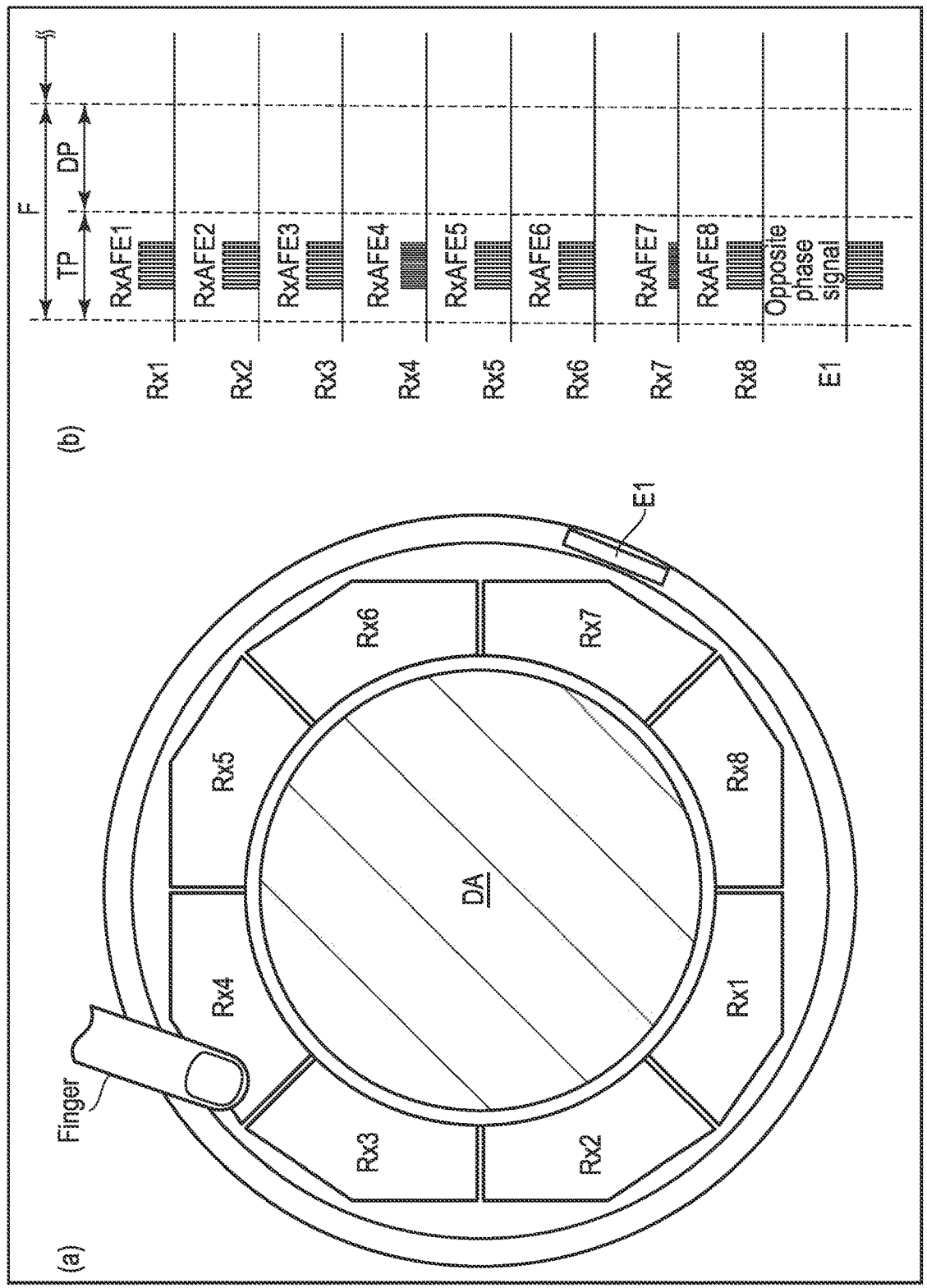
FIG. 13 is a view and a timing chart for explaining another operation example of the touch controller according to the embodiment.

Here, since it is assumed that the movable electrode E1 approaches to the detection electrode Rx7 as shown in (a) of FIG. 13, in a case where the above-described series of processing is executed based on the detection signal RxAFE7 shown in (b) of FIG. 13, the touch controller TC detects that the charge amount detected by the detection electrode Rx7 is larger than Qth, and detects that the movable electrode E1 approaches to the detection electrode Rx7.

In addition, here, since it is assumed that the finger which is the external approaching object is located on the detection electrode Rx4 as shown in (a) of FIG. 13, in a case where the above-described series of processing is executed based on the detection signal RxAFE 4 shown in (b) of FIG. 13, the touch controller TC detects that the charge amount detected by the detection electrode Rx4 is larger than Qf and is equal to or smaller than Qth, and detects that the external approaching object approaches to or comes into contact with the detection electrode Rx4.

Similarly to the first method shown in FIG. 12, a waveform of the detection signal RxAFE7 output from the detection electrode Rx7 to which the movable electrode E1 approaches has a smaller amplitude than waveforms of the detection signals output from the other detection electrodes Rx as shown in (b) of FIG. 13. In addition, the waveform of the detection signal RxAFE4 output from the detection electrode Rx4 to or with which the finger, which is the external approaching object, approaches or comes into contact has an amplitude that is larger than the waveform of the detection signal RxAFE7 output from the detection electrode Rx7 to which the movable electrode E1 approaches and is smaller than the waveforms of the detection signals output from the other detection electrodes Rx.

Figure 14:
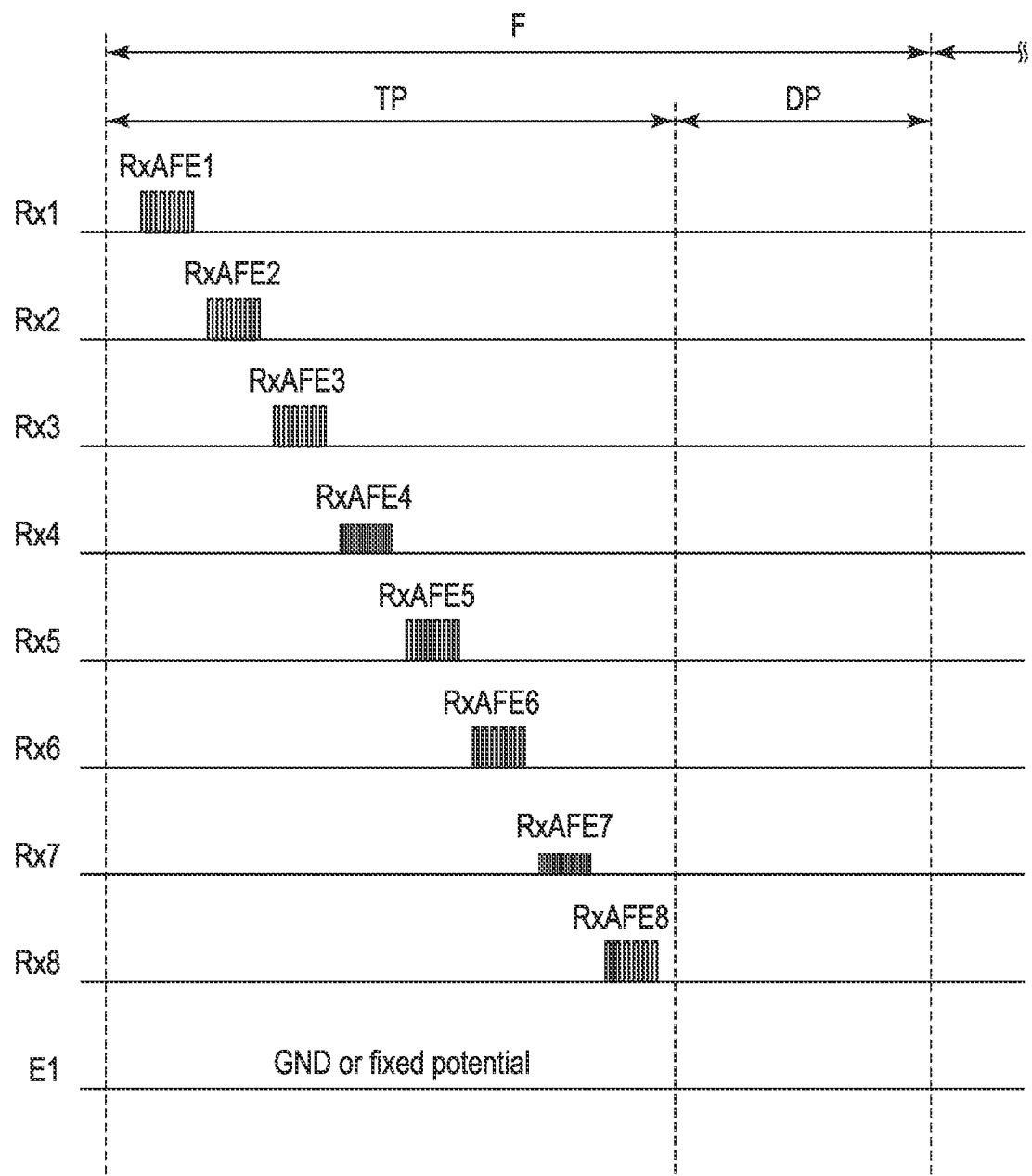
FIG. 14 is a timing chart for describing still another operation example of the touch controller according to the embodiment.
Figure 15:
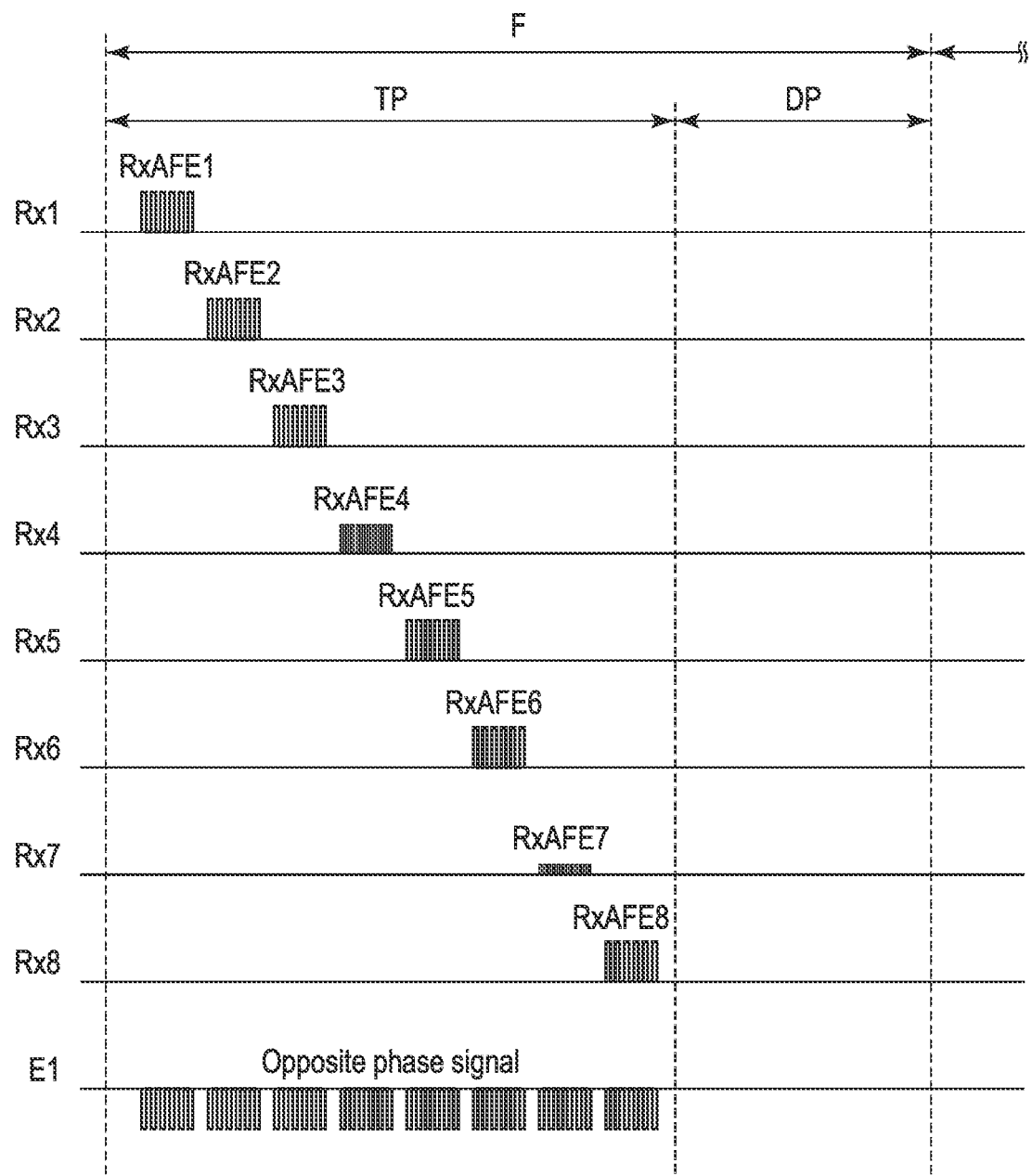
FIG. 15 is a timing chart for describing still another operation example of the touch controller according to the embodiment.

In FIGS. 12 and 13, the operation in a case where the detection signals RxAFE1 to RxAFE8 are simultaneously output from the detection electrodes Rx1 to Rx8 to the touch controller TC has been described, but the present invention is not limited thereto, and the detection signals RxAFE1 to RxAFE8 may be output from the detection electrodes Rx1 to Rx8 to the touch controller TC in a time division manner. In other words, as shown in FIGS. 14 and 15, the detection signals RxAFE1 to RxAFE8 may be output from the detection electrodes Rx1 to Rx8 to the touch controller TC in a time division manner. In FIG. 14, since a situation similar to the case of FIG. 12 described above is assumed except that the detection signals RxAFE1 to RxAFE8 are output in a time division manner, the detection signal RxAFE7 having a smaller amplitude than the other detection signals is output from the detection electrode Rx7, and the detection signal RxAFE4 having an amplitude that is larger than the detection signal RxAFE7 and is smaller than the other detection signals is output from the detection electrode Rx4. Similarly, in FIG. 15, since a situation similar to the case of FIG. 13 described above is assumed except that the detection signals RxAFE1 to RxAFE8 are output in a time division manner, the detection signal RxAFE7 having a smaller amplitude than the other detection signals is output from the detection electrode Rx7, and the detection signal RxAFE4 having an amplitude that is larger than the detection signal RxAFE7 and is smaller than the other detection signals is output from the detection electrode Rx4.

In FIGS. 12 to 15, for convenience of explanation, it is assumed that the detection electrodes Rx other than (A) the detection electrode Rx to which the movable electrode E1 approaches, and (B) the detection electrode Rx to or with which an external approaching object approaches or comes into contact, output detection signals having similar waveforms (intensities). But actually, a detection electrode Rx located adjacent the detection electrode Rx to which the movable electrode E1 approaches is also affected by the movable electrode E1 and outputs a detection signal having an intensity corresponding to a distance to the movable electrode E1. Similarly, the detection electrode Rx located adjacent the detection electrode Rx to or with which the external approaching object approaches or comes into contact is also affected by the external approaching object, and outputs a detection signal having an intensity corresponding to a distance to the external approaching object. This has been described together with FIG. 4 in the first embodiment described above, and thus a detailed description thereof will be omitted here.

Figure 16:
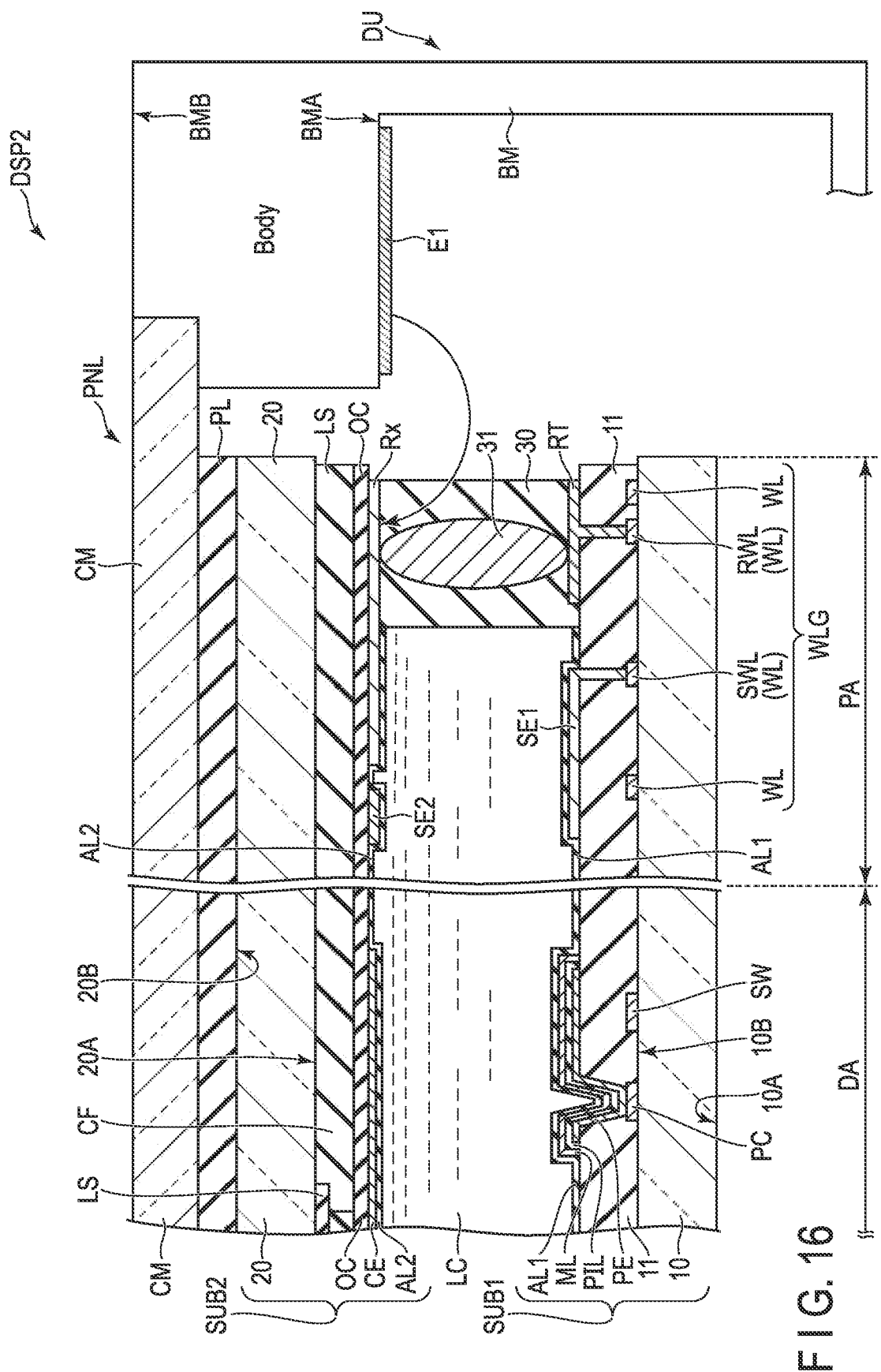
FIG. 16 is a cross-sectional view showing a configuration example of a display device according to the embodiment.

FIG. 16 is a cross-sectional view showing a schematic configuration example of a display device DSP2 according to the present embodiment. Hereinafter, only parts different from the configuration shown in FIGS. 8 to 10 described in the first embodiment, specifically, a dial portion DU will be described, and a description of other parts will be omitted.

As shown in FIG. 16, in a peripheral area PA, the dial portion DU is rotatably connected to a side surface of a cover member CM. The dial portion DU includes a body member BM and the movable electrode E1.

The body member BM is rotatably connected to the side surface of the cover member CM. The body member BM surrounds a side surface and a lower surface of the display panel PNL.

The body member BM includes a surface BMA and a surface BMB opposite to the surface BMA. The movable electrode E1 is disposed on a surface BMA side of the body member BM. The movable electrode E1 is disposed in parallel to the X-Y plane and is also disposed in parallel to the detection electrode Rx. A GND voltage or a predetermined DC voltage (fixed potential) is supplied to the movable electrode E1 according to the first method described above. Alternatively, an opposite phase signal is supplied to the movable electrode E1 according to the second method described above. With this configuration, it is possible to form a fringing field between the detection electrode Rx and the movable electrode E1 without causing the movable electrode E1 to function as a transmission electrode. In other words, the detection electrode Rx can detect a change in electrostatic capacitance caused by an approach of the movable electrode E1, thereby detecting the approach of the movable electrode E1 by the self capacitive sensing. In the configuration shown in FIG. 16, in a case where a GND voltage or a predetermined DC voltage is supplied to the movable electrode E1 according to the first method described above, the capacitance Cd>the threshold Cth>the capacitance Cf as described above in some cases. In this case, the capacitance between the movable electrode E1 and the detection electrode Rx is sufficiently larger than the capacitance caused by the approach or contact of the external approaching object. Therefore, a configuration corresponding to the third shielding electrode SE3 described in the first embodiment described above can be omitted. Similarly, in the configuration shown in FIG. 16, in a case where an opposite phase signal is supplied to the movable electrode E1 according to the second method described above, the charge amount Qd>the threshold Qth>the charge amount Qf as described above in some cases. In this case, the charge amount between the movable electrode E1 and the detection electrode Rx is sufficiently larger than the charge amount caused by the approach or contact of the external approaching object. Therefore, a configuration corresponding to the third shielding electrode SE3 described in the first embodiment described above can be omitted.

The configuration of the dial portion DU is not limited to the configuration shown in FIG. 16, and for example, the configuration shown in FIG. 9 may be applied. Even in this configuration, an approach of the movable electrode E1 can be detected by the self capacitive sensing by supplying a GND voltage or a predetermined DC voltage (fixed potential) to the movable electrode E1 or supplying an opposite phase signal to the movable electrode E1.

Figure 17:
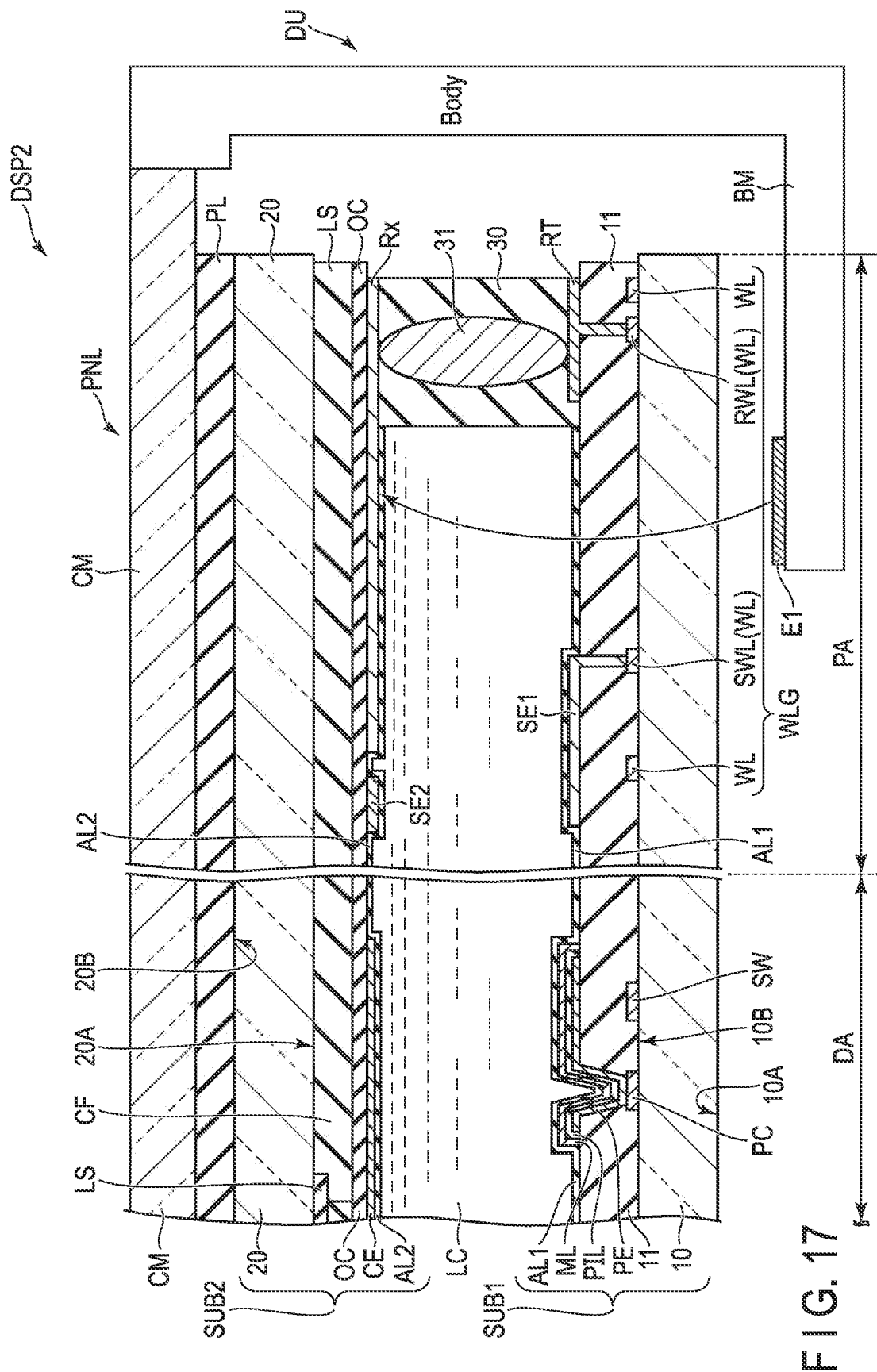
FIG. 17 is a cross-sectional view showing another configuration example of the display device according to the embodiment.

As shown in FIG. 17, for example, the configuration of the dial portion DU may be a configuration in which the movable electrode E1 is disposed on a lower surface of the body member BM. In this configuration, the movable electrode E1 faces the detection electrode Rx. A configuration (specifically, wiring lines other than wiring lines in a floating state, and the like) that can affect a fringing field formed between the movable electrode E1 and the detection electrode Rx is not interposed between the movable electrode E1 and the detection electrode Rx. Even in this configuration, an approach of the movable electrode E1 can be detected by the self capacitive sensing by supplying a GND voltage or a predetermined DC voltage (fixed potential) to the movable electrode E1 or supplying an opposite phase signal to the movable electrode E1.

The configuration shown in FIG. 17 can also be applied as a configuration (in other words, the configuration of the display device DSP1 according to the first embodiment described above) in a case where an approach or contact of an external approaching object is detected by the self capacitive sensing, and an approach of the movable electrode E1 is detected by the mutual capacitive sensing. In this case, the drive signal Tx is supplied from the touch controller TC to the movable electrode E1 at the start of the second touch period TP2, and an approach of the movable electrode E1 can be detected by the mutual capacitive sensing.

FIG. 18 is a view for explaining wiring lines connected to the movable electrode E1 disposed in the dial portion DU and shapes thereof. FIG. 18(a) corresponds to a case where the dial portion DU has the configuration shown in FIG. 17. FIG. 18(b) is a view corresponding to a case where the third shielding electrode SE3 is further disposed in addition to the configuration shown in FIG. 17.

As shown in (a) of FIG. 18, the movable electrode E1 is connected to a wiring line WL. A GND voltage or a predetermined DC voltage (fixed potential) is supplied to the movable electrode E1 via an electrode E4 and the wiring line WL. Alternatively, a signal having an opposite phase to that of the detection electrode Rx is supplied to the movable electrode E1 via the electrode E4 and the wiring line WL. As shown in (a) of FIG. 18, the wiring line WL has a spring portion (metal elastic body) formed of a metal material in a spring shape, and the spring portion is located between the movable electrode E1 and the electrode E4. The electrode E4 is disposed on the lower surface of the transparent substrate 10 of the display panel PNL, and can move (rotate) on the lower surface of the transparent substrate 10 when the dial portion DU rotates, for example. As the above-described spring portion is provided between the movable electrode E1 and the electrode E4, for example, it is possible to cope with a structure in which a distance between the movable electrode E1 and the electrode E4 varies depending on the location.

As shown in (b) of FIG. 18, the third shielding electrode SE3 may be disposed on a lower surface of the dial portion DU in order to block an influence from the outside of the dial portion DU. The third shielding electrode SE3 is connected to the shielding wiring line SWL. A GND voltage or a predetermined DC voltage (fixed potential) is supplied to the third shielding electrode SE3 via an electrode E5 and the shielding wiring line SWL. Alternatively, a signal that is in phase with the opposite phase signal supplied to the movable electrode E1 via the electrode E5 and the shielding wiring line SWL is supplied to the third shielding electrode SE3. As shown in (b) of FIG. 18, the shielding wiring line SWL has a spring portion (metal elastic body) formed of a metal material in a spring shape similarly to the wiring line WL, and the spring portion is located between the lower surface of the body member BM and the electrode E5. Similarly to the electrode E4, the electrode E5 is disposed on the lower surface of the transparent substrate 10 of the display panel PNL, and can move (rotate) on the lower surface of the transparent substrate 10 when the dial portion DU rotates, for example. As the spring portion as shown in (b) of FIG. 18 is provided, for example, it is possible to cope with a structure in which a distance between the lower surface of the body member BM and the electrode E5 varies depending on the location.

According to the second embodiment described above, it is possible to obtain the same effects as those of the first embodiment described above. Further, according to the present embodiment, an approach of the movable electrode E1 can be detected by the self capacitive sensing.

Figure 19:
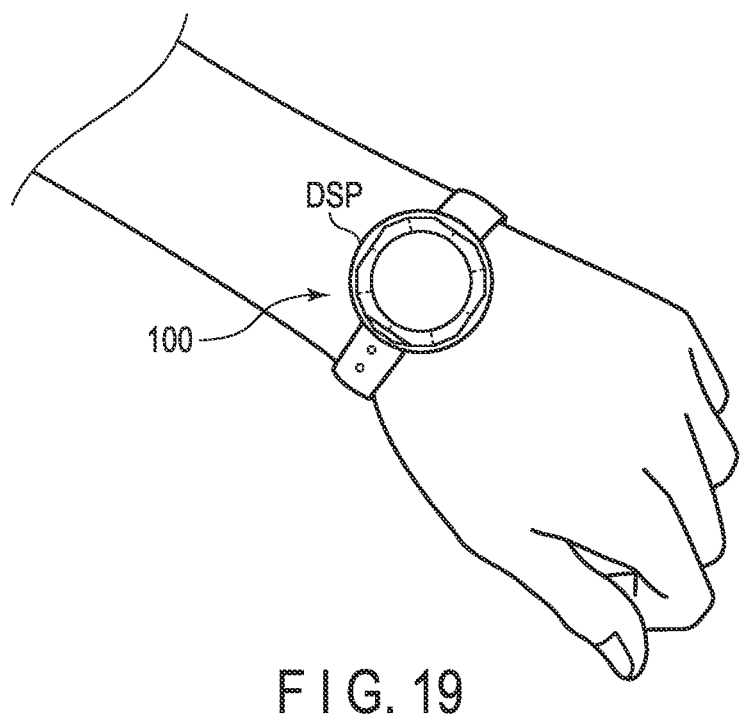
FIG. 19 is a view showing an application example of the display device according to each embodiment.

FIG. 19 illustrates an application example of the display device DSP according to each embodiment. As shown in FIG. 19, the display device DSP is applied to, for example, a wristwatch 100. In this case, a time or the like is displayed in the display area DA of the display device DSP, and the display device DSP can detect a predetermined gesture when the detection electrode disposed in the peripheral area is touched (for example, a gesture of touching an outer peripheral portion of the watch in such a way as to make one rotation clockwise, a gesture of touching the outer peripheral portion of the watch in such a way as to make one rotation counterclockwise, a tapping gesture, or the like), and can implement an operation according to the detected predetermined gesture. Further, when the dial rotates, the display device DSP can detect the rotation angle of the dial and implement an operation according to the rotation angle of the dial.

Figure 20:
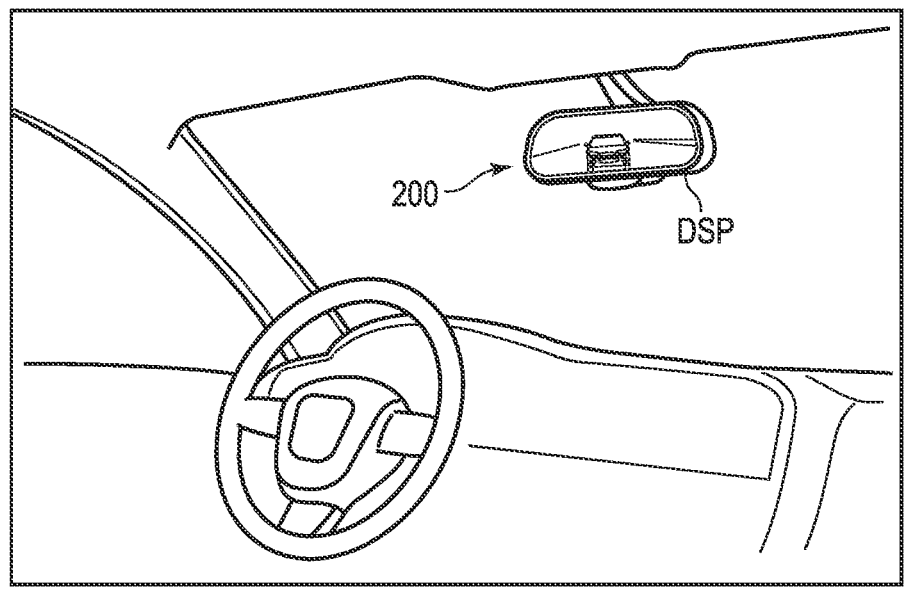
FIG. 20 is a view showing another application example of the display device according to each embodiment.

FIG. 20 illustrates another application example of the display device DSP according to each embodiment. As shown in FIG. 20, the display device DSP is applied to, for example, an in-vehicle rearview mirror 200. In this case, a video or the like of an area behind a vehicle captured by a camera installed in the vehicle is displayed in the display area of the display device DSP, and the display device DSP can detect a predetermined gesture when the detection electrode disposed in the peripheral area is touched, and can implement an operation according to the detected predetermined gesture. Further, when the dial rotates, the display device DSP can detect the rotation angle of the dial and implement an operation according to the rotation angle of the dial.

FIG. 21 illustrates still another application example of the display device DSP according to each embodiment. As shown in FIG. 21, the display device DSP is applied to, for example, a dial 300 of a camera. In this case, a plurality of icons or the like indicating shooting modes of the camera are displayed in the display area of the display device DSP, and the display device DSP can detect a predetermined gesture when the detection electrode disposed in the peripheral area is touched, and can implement an operation according to the detected predetermined gesture. Further, when the dial rotates, the display device DSP can detect the rotation angle of the dial and implement an operation according to the rotation angle of the dial.

FIG. 22 is a diagram for describing an example of a principle of touch detection by the self capacitive sensing. A voltage obtained by dividing a voltage of a power source Vdd by voltage divider using resistor is supplied to the detection electrode Rx as a bias voltage. A drive signal having a predetermined waveform is supplied from a drive circuit 400b to the detection electrode Rx by capacitive coupling or the like, and a detection signal having a predetermined waveform is read from the detection electrode Rx. At this time, when a capacitance caused by a finger or the like is applied to the detection electrode Rx, the amplitude of the detection electrode Rx changes. In FIG. 20, the amplitude of the detection electrode Rx decreases. Therefore, in an equivalent circuit shown in FIG. 22, a detection circuit 500b detects the amplitude of the detection electrode Rx to detect the presence or absence of an approach or contact of an external approaching object such as a finger. A self detection circuit is not limited to the circuit shown in FIG. 22, and any circuit system may be adopted as long as the presence or absence of an external approaching object such as a finger can be detected only with the detection electrode.

According to at least one embodiment described above, since the movable electrode E1 movable around the detection electrodes Rx1 to Rx8 is provided in addition to the plurality of detection electrodes Rx1 to Rx8, it is possible to provide the display device DSP capable of suppressing deterioration in operability due to a small display area DA for displaying an image.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
a display area for displaying an image;
a plurality of detection electrodes that are disposed in a peripheral area surrounding the display area;
a movable electrode that is disposed in such a way as to surround the detection electrodes and is movable around the detection electrodes; and
a shielding electrode that is opposed to the movable electrode and covers an entire surface of the moveable electrode, wherein
the movable electrode has a length corresponding to a length of each of the detection electrodes in a peripheral direction,
a size of the shield electrode corresponds to a size of the movable electrode, and
the movable electrode is positioned outside the detection electrodes.

2. The display device of claim 1, wherein the movable electrode has a length shorter than the length of each of the detection electrodes in the peripheral direction.

3. The display device of claim 1,
wherein the display device
detects an approaching or contacting object by self capacitive sensing based on a detection signal output from each of the detection electrodes according to a change in capacitance value in a first period, and
inputs a drive signal to the movable electrode and detects an approach of the movable electrode by mutual capacitive sensing based on a detection signal output from at least one of the detection electrodes in a second period.

4. The display device of claim 1,
wherein the display device detects an approaching or contacting object or an approach of the movable electrode by self capacitive sensing based on a detection signal output from each of the detection electrodes according to a change in capacitance value, and
a predetermined fixed potential or a signal having an opposite phase to a signal of each of the detection electrodes is applied to the movable electrode.

5. The display device of claim 1,
wherein the shielding electrode prevents an approaching or contacting object from affecting the movable electrode.

6. The display device of claim 5, wherein the shielding electrode has a size equal to or larger than a size of the movable electrode.

7. The display device of claim 6, wherein a predetermined fixed potential or a signal that is in phase with and has a same amplitude as a drive signal input to the movable electrode is applied to the shielding electrode.

8. The display device of claim 1, further comprising a housing in which the movable electrode is disposed, wherein the housing is formed of a metal material and prevents an approaching or contacting object from affecting the movable electrode.

9. The display device of claim 1, further comprising:
a first substrate;
a second substrate that is opposed to the first substrate; and
a liquid crystal layer held between the first substrate and the second substrate.

10. The display device of claim 1, wherein the movable electrode is disposed in parallel to the detection electrodes.

11. The display device of claim 1, wherein the movable electrode is disposed perpendicular to the detection electrodes.

12. The display device of claim 1, wherein the movable electrode is disposed to face the detection electrodes.

13. The display device of claim 3,
wherein the display device detects a position of the movable electrode based on intensities of detection signals output from the detection electrodes and detects a rotation angle of the movable electrode by recognizing a time-series change in position of the movable electrode.

14. The display device of claim 1, wherein the movable electrode is electrically connected to a predetermined electrode via a metal elastic body integrally formed with a housing in which the movable electrode is disposed.

* * * * *